United States Patent
Nishikawa et al.

(10) Patent No.: US 6,328,916 B1
(45) Date of Patent: Dec. 11, 2001

(54) ADDITION METHOD OF SUPERCRITICAL CARBON DIOXIDE, AND PRODUCTION PROCESS OF EXPANDED THERMOPLASTIC RESIN PRODUCT BY MAKING USE OF THE ADDITION METHOD

(75) Inventors: Shigeo Nishikawa; Eiichi Sugihara; Masahiro Takedachi; Kaoru Yorita; Haruo Inoue; Yoko Shimada; Michio Eriguchi, all of Kanagawa (JP)

(73) Assignee: Mitsui Chemicals, Inc. (JP)

(*) Notice: Subject to any disclaimer, the term of this patent is extended or adjusted under 35 U.S.C. 154(b) by 0 days.

(21) Appl. No.: 09/351,336

(22) Filed: Jul. 12, 1999

(30) Foreign Application Priority Data

Jul. 16, 1998 (JP) .................................................... 2-02059

(51) Int. Cl.[7] .................................................. B29C 44/02
(52) U.S. Cl. ............................................. 264/53; 264/50
(58) Field of Search ........................................ 264/50, 53

(56) References Cited

U.S. PATENT DOCUMENTS

| | | | |
|---|---|---|---|
| 3,677,020 | * 7/1972 | Munselle | 62/603 |
| 4,344,710 | 8/1982 | Johnson et al. | |
| 5,049,328 | * 9/1991 | Meyer et al. | 264/50 |
| 5,158,986 | 10/1992 | Cha et al. | |
| 5,334,356 | 8/1994 | Baldwin et al. | |
| 5,686,031 | * 11/1997 | Coronado et al. | 264/50 |
| 5,830,393 | * 11/1998 | Nishikawa et al. | 264/50 |
| 5,997,781 | * 12/1999 | Nishikawa et al. | 264/50 |

FOREIGN PATENT DOCUMENTS

| | | |
|---|---|---|
| 0818292A2 | 1/1998 | (EP) . |
| 1-222922 | 9/1989 | (JP) . |
| 6-41161 | 6/1994 | (JP) . |
| 8-11190 | 1/1996 | (JP) . |
| 10-76560 | 3/1998 | (JP) . |

* cited by examiner

Primary Examiner—Allan R. Kuhns
(74) Attorney, Agent, or Firm—Burns, Doane, Swecker, & Mathis, L.L.P.

(57) ABSTRACT

This invention provides a method for stably adding a predetermined amount of supercritical carbon dioxide at a fixed delivery rate into a forming machine and also a process for producing an expanded thermoplastic resin product by making use of the addition method. Carbon dioxide is charged from a liquefied carbon dioxide cylinder (1) into a predetermined amount deliverable pump (2) while allowing the carbon dioxide to remain in a liquefied state. When the carbon dioxide is pressurized and delivered by the predetermined amount deliverable pump (2), a delivery pressure of the carbon dioxide is controlled at an optional pressure within a range of from a critical pressure (7.4 MPa) of carbon dioxide to 40 MPa to deliver the carbon dioxide without any fluctuation of the amount of the delivery by setting up the pressure of a pressure control valve (3). The carbon dioxide is heated to a critical temperature (31° C.) of carbon dioxide or higher to convert it into supercritical carbon dioxide. This supercritical carbon dioxide is then added to a molten thermoplastic resin in the forming machine (4).

19 Claims, 10 Drawing Sheets

ADDITION METHOD OF SUPERCRITICAL CARBON DIOXIDE, AND PRODUCTION PROCESS OF EXPANDED THERMOPLASTIC RESIN PRODUCT BY MAKING USE OF THE ADDITION METHOD

BACKGROUND OF THE INVENTION

1) Field of the Invention

This invention relates to a method for adding supercritical carbon dioxide to a molten thermoplastic resin and also to a process for producing an expanded thermoplastic resin product by making use of the addition method. More specifically, the present invention is concerned with a process for producing expanded thermoplastic resin products of uniform quality by using carbon dioxide as a blowing agent.

2) Description of the Prior Art

For the production of expanded thermoplastic resin products, processes making use of a chemical blowing agent or gas blowing agent are known. A chemical expanding process generally comprises mixing raw material pellets with an organic blowing agent of a low molecular weight, which decomposes at a molding temperature to produce gas, and then heating the resulting mixture in an extruder to a decomposing temperature of the blowing agent or higher to effect expansion molding. According to this process, the decomposition temperature can be easily adjusted by adding an expanding aid or the like. Moreover, this process can obtain expanded products having relatively uniform closed cells. However, in addition to high cost, these expanded products tend to develop discoloration, offensive odor, food sanitation problems and the like due to decomposition residues of the blowing agent, said decomposition residues still remaining in the expanded products, and an undecomposed portion of the blowing agent. There are other problems including smearing of molding machines caused by a chemical blowing agent and defective molding associated with such smearing.

On the other hand, a gas expanding process making use of a physical blowing agent is a process which comprises melting a resin in a molding machine, feeding an organic compound of a low boiling point such as butane, pentane or dichlorodifluoromethane to the resin, kneading the resin and the organic compound together, and then releasing the resulting mixture into a low-pressure zone to effect expansion molding. The organic compound of the low melting point, which is employed in this process, has compatibility with the resin and is hence excellent in solubility and also in retention, so that it features the availability of expanded products of high expansion ratios. Nonetheless, such blowing agents are costly and moreover, have dangers such as inflammability and toxicity. They also have a potential problem of air pollution. Further, there is a move toward the total ban of flon-series gases led by dichlorodifluoromethane in view of environmental problems such as destruction of the ozonosphere.

With a view to overcoming such problems of the conventional processes, numerous processes making use of an inert gas such as carbon dioxide gas or nitrogen as a blowing agent, said inert gas being clean and economical, have been proposed. However, the inert gas has poor solubility in a resin because of its low compatibility with the resin. Expanded products have large and uneven cell diameters and low cell populations, leading to problems in external appearance, mechanical strength and heat insulating properties. Further, no method has been established yet for the stable addition of an inert gas into a molding machine. Uneven expansion therefore occurs on products, thereby making it difficult to obtain expanded products of uniform quality.

When an expanded thermoplastic resin product is produced using an inert gas, especially carbon dioxide, it has been the conventional practice to add the gas directly from a gas cylinder via a pressure reducing valve. According to this method, however, fluctuations take place in the flow rate of the blowing agent due to fluctuations in the pressure of a resin in a blowing agent adding section. As a result, uneven expansion occurs on products, thereby making it impossible to obtain expanded products of uniform quality. In addition, this method cannot add the blowing agent if the pressure of the resin in the blowing agent adding section is higher than the pressure of the gas cylinder.

U.S. Pat. No. 5,158,986 discloses a technique for obtaining an expanded product by using a supercritical fluid as a blowing agent and impregnating a thermoplastic resin with the supercritical fluid. As a supercritical fluid has excellent solubility similar to that of a liquid and superb diffusibility close to that of a gas, it shows high solubility and diffusion rate in a resin. The resin can therefore be impregnated with the blowing fluid in a short time. Two processes are proposed for obtaining expanded products in this patent publication, one comprising forming a thermoplastic resin into a sheet through an extruder, introducing the sheet into a pressurized chamber filled with carbon dioxide in a supercritical state to impregnate the sheet with carbon dioxide, and then heating the sheet by a heater in an expanding chamber under atmospheric pressure to cause the sheet to expand; and the other comprising melting a resin in an extruder, impregnating the molten resin with carbon dioxide in a supercritical state, extruding the resulting impregnated resin into a sheet-like product, introducing the sheet-like product into a pressurized chamber to form cell nuclei owing to the pressure difference, and then heating or cooling the resultant sheet.

These processes however require large-scale high-pressure facilities and hence an enormous initial cost and are poor in work efficiency, so that they can be hardly practiced on an industrial scale. Further, the former process requires a long time for the full impregnation of the sheet-like product with carbon dioxide because the sheet-like product is directly impregnated. On the other hand, the latter process impregnates carbon dioxide into the molten resin so that the penetration speed of carbon dioxide in the latter process is faster than that in the former process. It is however difficult to achieve solubilization of carbon dioxide through kneading in only one extruder.

The present inventors proposed in Japanese Patent Application No. 185268/1997 (Japanese Patent Laid-Open No. 76560/1998) a process for the production of an expanded thermoplastic resin product by expansion extrusion, in which carbon dioxide and/or nitrogen in a supercritical state is used as a blowing agent.

In the above invention, two methods are exemplified for mixing the blowing agent into a melt of a resin composition in a continuous plasticator, one being to inject gaseous carbon dioxide and/or nitrogen under compression with a gas, and the other to inject liquefied carbon dioxide and/or nitrogen by a plunger pump. These methods can perform, in a simple step and with simple facilities, the addition of carbon dioxide in a supercritical state into an extruder, said addition being practically unfeasible in any manner applicable for industrial production when the technique of U.S. Pat. No. 5,158,986 is relied upon.

Through a further investigation by the present inventors, it has become increasingly clear that the amount and pressure of carbon dioxide, which is delivered from a compressor pump, fluctuate depending on the temperature around the compressor pump and the temperature of carbon dioxide to be injected into the compressor pump. Incidentally, the above invention makes no mention about the production of an expanded product the expansion ratio of which exceeds 10 times.

As a further method for adding a blowing agent under a pressure equal to or higher than its critical pressure, a process for obtaining an expanded thermoplastic resin product is proposed in Japanese Patent Laid-Open No. 222922/1989. According to this process, the pressure of an inert gas is adjusted via a reducing value to fall within a range not lower than the pressure of a molten resin in a gas addition section but not higher than 9.8 MPa, and is then injected into an extruder. However, this process cannot add the blowing agent either if the resin pressure is 9.8 MPa or higher. It is therefore necessary to control the pressure of the molten resin at 9.8 MPa or lower in the gas adding section. Significant limitations are therefore imposed on the usable resin, the extruder and extrusion conditions, so that expanded products available by this process are substantially limited. When carbon dioxide is used as a blowing agent, its addition at 9.8 MPa or lower into the extruder is accompanied by a limitation on a maximum amount to which the blowing agent can be added. Products of a high expansion ratio are not available accordingly. Further, the solubility of carbon dioxide in the molten resin is poor, and a substantial time is required until dissolution. Expanded products available from this process have large cell diameters, uneven cell distribution, and small cell populations.

For the provision of an expanded thermoplastic resin product, a still further process is proposed in Japanese Patent Publication No. 41161/1994. According to this process, pressurized carbon dioxide is once stored in a tank with its temperature maintained at its critical temperature or higher, and the pressurized carbon dioxide is then reduced in pressure and is charged at a pressure of 9.8 MPa or higher into an extruder while controlling its flow rate.

This process is however accompanied by a limitation on a maximum amount to which carbon dioxide can be added. The patent publication contains a statement to the effect that carbon dioxide cannot be added stably into the system if its proportion exceeds 2 wt.%. Therefore, any attempt to obtain a product of a high expansion ratio leads to occurrence of uneven expansion on the product, thereby making it difficult to obtain expanded products of uniform quality. Moreover, this process requires large-scale and complex facilities, so that a significant initial cost and a wide installation site are needed. This process also involves a still further problem in that the flow rate of carbon dioxide is hardly controllable.

As has been described above, use of carbon dioxide as a blowing agent has heretofore been difficult in stably adding a predetermined amount of carbon dioxide to a molten thermoplastic resin in a forming machine. It has therefore been difficult to obtain expanded products of uniform quality, especially to produce expanded products of a high expansion ratio with uniform quality.

SUMMARY OF THE INVENTION

An object of the present invention is therefore to provide a method for stably adding a predetermined amount of carbon dioxide as a blowing agent to a molten thermoplastic resin in a forming machine so that an expanded thermoplastic resin product having uniform cells can be produced without uneven expansion by using carbon dioxide as a blowing agent. Another object of the present invention is to provide a process for producing an expanded thermoplastic resin product, which makes use of the above addition method.

With a view to obtaining expanded thermoplastic resin products of uniform quality by using carbon dioxide as a blowing agent, the present inventors have proceeded with an extensive investigation on a method for permitting stable addition of a predetermined amount of carbon dioxide to a molten thermoplastic resin in a forming machine. As a result, it has been found that, to pressurize carbon dioxide to its critical pressure or higher in a predetermined amount deliverable pump and to feed it at a constant rate into a forming machine (4), carbon dioxide has to be charged into the predetermined amount deliverable pump while allowing it to remain in a liquefied state, leading to the present invention.

Specifically, the present invention encompasses the following invention and embodiments:

(A) A method for the addition of supercritical carbon dioxide to a molten thermoplastic resin, which comprises charging carbon dioxide from a liquefied carbon dioxide cylinder (1) into a predetermined amount deliverable pump (2) while allowing said carbon dioxide to remain in a liquefied state, delivering said carbon dioxide from said predetermined amount deliverable pump (2) in such a manner that, when said carbon dioxide is pressurized and delivered by said predetermined amount deliverable pump (2), a delivery pressure is controlled at an optional pressure in a range of from a critical pressure (7.4 MPa) of carbon dioxide to 40 MPa to deliver said carbon dioxide without any fluctuation of the amount of the delivery by setting up the pressure of a pressure control valve (3), heating said carbon dioxide to a critical temperature (31° C.) of carbon dioxide or higher to convert said carbon dioxide into supercritical carbon dioxide, and then adding said supercritical carbon dioxide to said molten thermoplastic resin.

(B) The method described under (A), wherein upon adding said supercritical carbon dioxide to said molten thermoplastic resin, a pressure of said molten thermoplastic resin in a carbon dioxide adding section of a forming machine (4) has been raised beforehand to a pressure equal to or higher than the critical pressure (7.4 MPa) of carbon dioxide.

(C) The method described under (A) or (B), wherein said liquefied carbon dioxide to be charged from said liquefied carbon dioxide cylinder (1) into said predetermined amount deliverable pump (2) is controlled such that said liquefied carbon dioxide has a constant temperature in a range of from −30 to 15° C. at an inlet of said predetermined amount deliverable pump (2).

(D) The method described under any one of (A)–(C), wherein a flow line from said liquefied carbon dioxide cylinder (1) to said predetermined amount deliverable pump (2) is cooled by a cooling medium circulator in which a cooling medium is controlled at a constant temperature in a range of from −60 to 0° C.

(E) The method described under any one of (A)–(D), wherein said predetermined amount deliverable pump (2) is controlled to have a constant volumetric efficiency in a range of from 60 to 95%.

(F) The method of any one of (A)–(E), wherein said liquefied carbon dioxide cylinder (1) is a siphon cylinder.

(G) A process for the production of an expanded thermoplastic resin product, said process comprising:

(i) as a gas dissolving step, melting a thermoplastic resin at a temperature equal to or higher than a melting point or plasticizing temperature of said thermoplastic resin in a continuous plasticator equipped with a feed line through which a blowing agent is added to the molten thermoplastic resin, adding carbon dioxide in a proportion of from 0.1 to 30 parts by weight per 100 parts by weight of said thermoplastic resin, and forming a molten thermoplastic resin composition in which said thermoplastic resin and said carbon dioxide are in a mutually-dissolved state;

(ii) as a cooling step, cooling said molten thermoplastic resin composition to a temperature, which is equal to or higher than a plasticizing temperature of said molten thermoplastic resin composition, is higher by 50° C. or less than said plasticizing temperature of said molten thermoplastic resin composition and is equal to or lower than said melting temperature in said gas dissolving step, at a tip portion of said continuous plasticator while maintaining said molten thermoplastic resin composition under a pressure equal to or higher than a critical pressure of carbon dioxide;

(iii) as a cell nuclei forming step, extruding said molten thermoplastic resin composition through a die connected to the tip portion of said continuous plasticator and set to an optimal expansion temperature of said molten thermoplastic resin composition, whereby said pressure of said molten thermoplastic resin composition is lowered to a pressure equal to or lower than said critical pressure of carbon dioxide to induce formation of cell nuclei; and (iv) as an expansion control step, rapidly cooling the thus-extruded expanded thermoplastic resin product to a temperature equal to or lower than a crystallization temperature or glass transition temperature of said thermoplastic resin, wherein said addition of said carbon dioxide in said gas dissolving step (i) is performed by the addition method of carbon dioxide as defined under (A).

(H) A process for the production of an expanded thermoplastic resin product, said process comprising:

(i) as a gas dissolving step, melting a thermoplastic resin at a temperature equal to or higher than a melting point or plasticizing temperature of said thermoplastic resin in a resin-plasticating cylinder (23) equipped with a feed line through which a blowing agent is added to the molten thermoplastic resin, adding carbon dioxide in a proportion of from 0.1 to 30 parts by weight per 100 parts by weight of said thermoplastic resin, and forming a molten thermoplastic resin composition in which said thermoplastic resin and said carbon dioxide are in a mutually dissolved state;

(ii) as a cooling step, cooling said molten thermoplastic resin composition to a temperature, which is equal to or higher than a plasticizing temperature of said molten thermoplastic resin composition, is higher by 50° C. or less than said plasticizing temperature of said molten thermoplastic resin composition and is equal to or lower than said melting temperature in said gas dissolving step, in said resin-plasticating cylinder (23);

(iii) as a metering and injection step, metering the thus-cooled molten thermoplastic resin composition and injecting the same into a mold (30); and (iv) as an expansion control step, inducing formation of cell nuclei to control an expansion ratio by lowering a pressure in said mold (30), wherein (v) said addition of said carbon dioxide in said gas dissolving step is performed by the addition method of carbon dioxide as defined under (A).

(I) The process described under (H), wherein said expansion control step is performed by releasing a high-pressure gas filled in said mold (30) and/or causing at least a portion of a core of said mold (30) to move backward subsequent to said injection of said molten thermoplastic resin composition.

(J) The process of any one of (G)–(I), wherein upon adding said supercritical carbon dioxide to said molten thermoplastic resin, a pressure of said molten thermoplastic resin in a carbon dioxide adding section of a forming machine (4) has been raised beforehand to a pressure equal to or higher than the critical pressure (7.4 MPa) of carbon dioxide.

(K) The process of any one of (G)–(J), wherein said liquefied carbon dioxide to be charged from said liquefied carbon dioxide cylinder (1) into said predetermined amount deliverable pump (2) is controlled such that said liquefied carbon dioxide has a constant temperature in a range of from −30 to 15° C. at an inlet of said predetermined amount deliverable pump (2).

(L) The process of any one of (G)–(K), wherein a flow line from said liquefied carbon dioxide cylinder (1) to said predetermined amount deliverable pump (2) is cooled by a cooling medium circulator in which a cooling medium is controlled at a constant temperature in a range of from −60 to 0° C.

(M) The process of any one of (G)–(L), wherein said predetermined amount deliverable pump (2) is controlled to have a constant volumetric efficiency in a range of from 60 to 95%.

(N) The process of any one of (G)–(M), wherein said liquefied carbon dioxide cylinder (1) is a siphon cylinder.

(O) The process of any one of (G)–(N), wherein the molten thermoplastic resin composition further comprises at least one additive selected from the group consisting of fine inorganic powders, aliphatic carboxylic acids and derivatives thereof, and chemical blowing agents.

(P) The process of (O), wherein said at least one additive is talc as a fine inorganic powder.

(Q) The process of (O), wherein said at least one additive is zinc stearate as an aliphatic carboxylic acid derivative.

(R) The process of (O), wherein said at least one additive is sodium hydrogencarbonate and/or citric acid as a chemical blowing agent which gives off gas composed of carbon dioxide and/or nitrogen upon thermal decomposition.

(S) An expanded thermoplastic resin product having an expansion ratio of from 5 to 100 times and produced by the production process of any one of (G)–(R).

Figure 1:
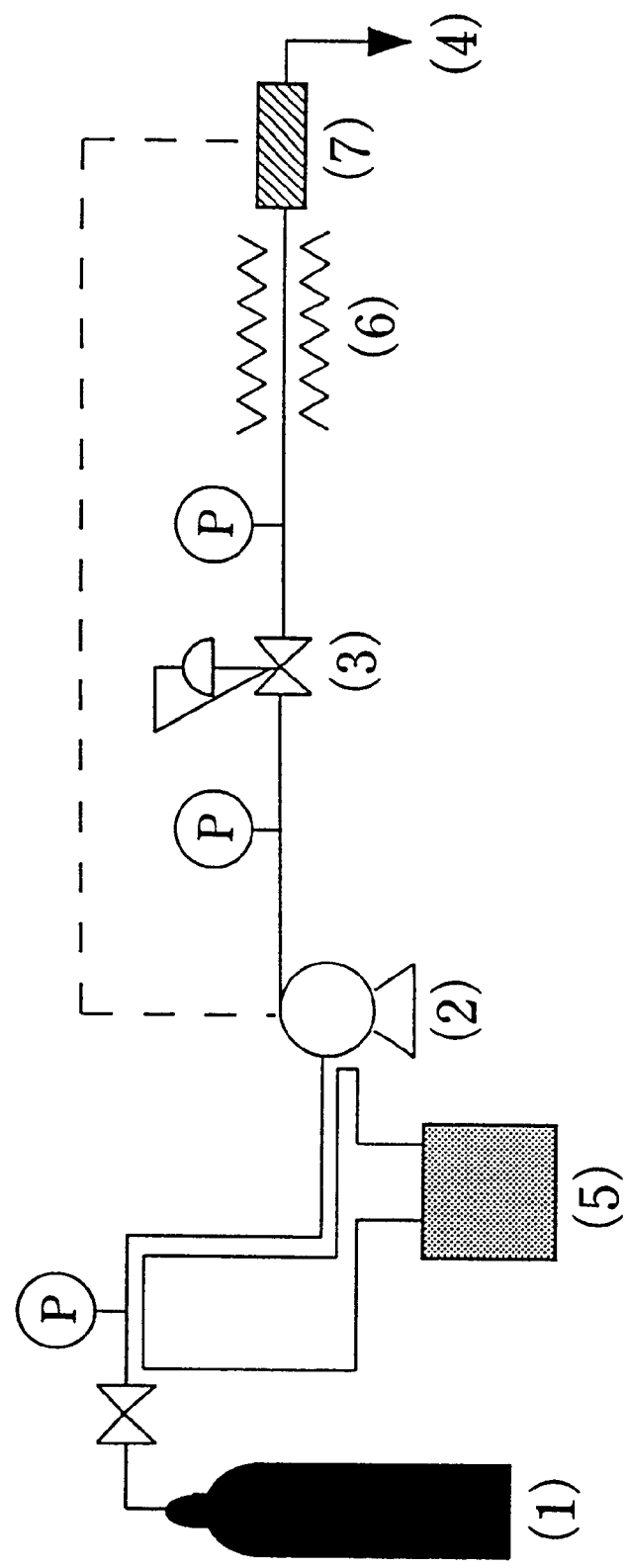
FIG. 1 is schematic construction diagram illustrating a method according to an embodiment of the present invention for the addition of supercritical carbon dioxide.

In these figures of the drawings, there are shown a liquefied carbon dioxide cylinder 1, a predetermined amount deliverable pump 2, a pressure control valve 3, a forming machine (molding machine or extruder) 4, a cooling medium circulator 5, a heater 6, a flowmeter 7, a hopper 8, a first extruder 9, a screw 10, a connecting member 11, a second extruder 12, a die 13, a mandrel 14, an expanded sheet 15, a carbon dioxide cylinder 16, a pressure reducing valve 17, a first compressor 18, a second compressor 19, a tank 20, a flow regulator 21, an in-line injection molding machine 22, a resin-plasticating cylinder 23, an adapter 24, a resin accumulator plunger 25, a resin accumulator 26, an on-off valve 27, an injection plunger 28, an injector 29, a mold 30, a gas cylinder 31, a pressure control valve 32, and an on-off valve 33.

DESCRIPTION OF THE PREFERRED EMBODIMENTS

The present inventors conducted an investigation for the achievement of the above-described objects. With reference to FIG. 1, a description will be made about an apparatus and a process both of which were designed for the present invention.

In the specification of this invention, the term "volumetric efficiency of a pump" means a value calculated by the following Equation 1:

$$\eta = Q/Qth \times 100 \, (\%) \qquad \text{(Equation 1)}$$

where $\eta$: volumetric efficiency (%),

Q: a volume actually delivered by the pump (l/min), and

Qth: theoretical delivery rate (l/min).

The theoretical delivery rate Qth is calculated by the following Equation 2:

$$Qth = (\pi D^2 LN/4) \times 10^{-6} \qquad \text{(Equation 2)}$$

where

D: pump plunger diameter or pump piston diameter (mm),

L: pump stroke length (mm), and

N: pump speed (rpm).

Further, in the specification and claims of this invention, the term "predetermined amount deliverable pump" means a pump which can deliver continuously and stably a predetermined amount of carbon dioxide per unit of time, within a range of the deliverable capacity of said pump, into a molten thermoplastic resin.

From the liquefied carbon dioxide cylinder 1, carbon dioxide is charged in a liquefied state into the predetermined amount deliverable pump 2. For the assurance of the charging of the carbon dioxide in the liquefied state into the pump, use of a liquefied carbon dioxide cylinder of the siphon type is preferred. This is to permit direct supply of carbon dioxide from a liquefied phase of the carbon dioxide in the cylinder. Further, the distance of a flow line from the liquefied carbon dioxide cylinder 1 to the predetermined amount deliverable pump 2 is set as short as possible, and this flow line is formed of a double pipe or the like and is cooled by the cooling medium circulator 5. As a cooling medium, it is preferred to use an aqueous ethylene glycol solution or an aqueous methanol solution. The temperature of the cooling medium circulator 5 may be set preferably at $-60°$ C. to $0°$ C. A temperature higher than $-10°$ C. brings liquefied carbon dioxide into a state prone to evaporation, so that the volumetric efficiency is lowered and does not remain stable. This makes it impossible to add liquefied carbon dioxide at a constant rate. A temperature lower than $-60°$ C., on the other hand, brings liquefied carbon dioxide into a state susceptible to solidification. The volumetric efficiency does not remain stable, thereby failing to permit any fixed-rate addition.

It is also preferred to keep the temperature of liquefied carbon dioxide constant by applying a heat insulator or the like to the main body of the predetermined amount deliverable pump 2, including a check valve, to eliminate a heat exchange as much as possible.

To keep constant the pressure of the cylinder, it is also preferred to arrange the liquefied carbon dioxide cylinder 1 in a place which is maintained at a constant temperature in a range of from 15 to $30°$ C.

The carbon dioxide, which is allowed to remain in the liquefied state, is delivered from said predetermined amount deliverable pump 2 in such a manner that, when said carbon dioxide is pressurized and delivered by said predetermined amount deliverable pump 2, a delivery pressure is controlled at an optional pressure within a range of from the critical pressure (7.4 MPa) of carbon dioxide to 40 MPa to deliver said carbon dioxide without any fluctuation of the amount of the delivery by setting up the pressure of the pressure control valve 3. A delivery pressure lower than the critical pressure (7.4 MPa) of carbon dioxide causes a phase change, so that the volumetric efficiency does not remain stable and no fixed-rate addition is feasible. A delivery pressure higher than 40 MPa, on the other hand, lowers the volumetric efficiency and moreover, makes the volumetric efficiency unstable. No fixed-rate addition is therefore feasible.

When carbon dioxide is added by a predetermined amount deliverable pump, cavitation takes place. Therefore it has heretofore been believed difficult to add carbon dioxide at a constant rate by such a predetermined amount deliverable pump. The present inventors hence conducted an extensive investigation, and as a result, it has been found that the carbon dioxide can be delivered at a fixed rate by providing a pressure control valve 3 and setting up the pressure thereof, and that the volumetric efficiency of the predetermined amount deliverable pump 2 can be controlled constant within a range of from 60% to 95% by controlling the temperature on an inlet side of the predetermined amount deliverable pump 2 and the delivery pressure on an outlet side of the predetermined amount deliverable pump 2 constant within the above-mentioned condition ranges. It is the common practice for a predetermined amount deliverable pump to control its volumetric efficiency at 95% or higher. Nonetheless, it is considered very difficult to add carbon dioxide at a volumetric efficiency of 95% or higher. According to the present invention, a method has been found to stabilize a delivery rate by controlling a volumetric efficiency constant within a range of from 60% to 95%.

Preferred as the predetermined amount deliverable pump 2 for use in the present invention is a plunger pump which is provided with a high-pressure plunger seal to prevent fluid leakage and also makes use of a double-ball check valve to accurately control a flowout direction.

In addition, application of a heat insulator or the like is preferred to maintain the temperature constant along a flow line from the predetermined amount deliverable pump 2 to the pressure control valve 3.

The carbon dioxide, which has been stably delivered at a constant rate is heated by a heater to the critical temperature (31° C.) or higher in a flow line up to a point where the carbon dioxide is added to a molten thermoplastic resin in the forming machine 4. In addition, the pressure of the molten resin in a carbon-dioxide-adding section of the forming machine 4 is raised beforehand to the critical pressure (7.4 MPa) of carbon dioxide or high. After the carbon dioxide is brought to a temperature and pressure equal to or higher than the critical temperature and pressure, in other words, into a supercritical state in the flow line from the pressure control valve 3 to the forming machine 4, it is added to the molten thermoplastic resin in the forming machine 4. In the method of the present invention, the conversion of carbon dioxide into a supercritical state significantly improves the solubility of carbon dioxide in a resin and hence stably produces expanded products having a uniform cell diameter, compared with a method in which carbon dioxide is added in a gaseous state or a liquid state to the molten thermoplastic resin as has been practiced to date. In addition, the method of the present invention facilitates addition of carbon dioxide in a large amount at a constant rate, so that expanded products having a high expansion ratio can be stably produced with ease.

Determination of an added amount of carbon dioxide is effected, for example, by the flowmeter 7 or by measuring a weight reduction rate of the cylinder. Preferably, it is determined by the flowmeter 7. As the flowmeter 7, it is preferred to use a direct mass flowmeter which is a high-precision flowmeter and is not affected by the temperature, pressure, viscosity, density or the like of fluid. No particular limitation is imposed on the point of arrangement of the flowmeter and the flowmeter can be arranged on the inlet side or outlet side of the predetermined amount deliverable pump 2, it is most preferred to arrange it immediately before the forming machine.

Further, a flow rate of the carbon dioxide as detected by the flowmeter 7 may be fed back to the predetermined amount deliverable pump 2 to perform control for the maintenance of a predetermined flow rate. This method is more preferred for the stable production of expanded products.

According to the method of the present invention, a predetermined amount of carbon dioxide can be stably added at a constant rate to the molten thermoplastic resin in the forming machine 4. As a result, it becomes possible to produce expanded thermoplastic resin products of uniform quality.

Incidentally, the term "thermoplastic resin" embraces not only thermoplastic resin itself but also thermoplastic resin compositions each of which contains one or more of blowing agents of the thermal decomposition type, aliphatic carboxylic acids and derivatives thereof, fine inorganic powders and the like, which may be added to a thermoplastic resin as needed, and the term "molten thermoplastic resin composition" as used herein means a mixture in such a state that carbon dioxide as a blowing agent and a thermoplastic resin in a molten state are evenly mixed.

Figure 2:
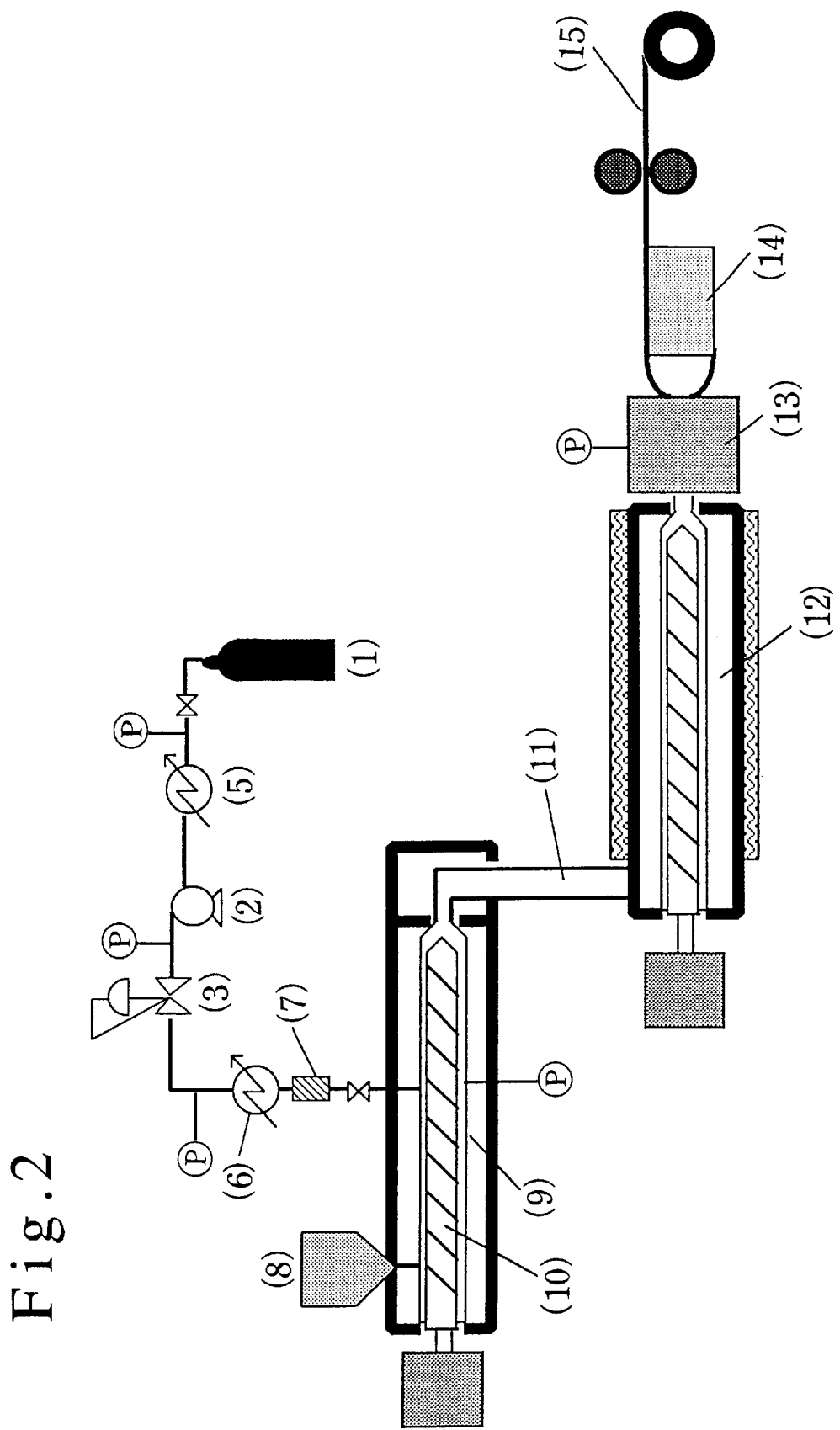
FIG. 2 is schematic construction diagram illustrating a process according to a first embodiment of the present invention for the production of an expanded thermoplastic resin product.

The embodiments of the present invention will hereinafter be described with reference to the drawings. In FIGS. 1 to 2, there are illustrated the liquefied carbon dioxide cylinder 1, the predetermined amount deliverable pump 2, the pressure control valve 3, the forming machine 4, the cooling medium circulator 5, the heater 6, the flowmeter 7, the hopper 8, the first extruder 9, the screw 10, the connecting member 11, the second extruder 12, the die 13, and the mandrel 14.

No particular limitation is imposed on the resin processing or forming machine to which the addition method of supercritical carbon dioxide, said method pertaining to the present invention, can be applied. Forming machines usable in known resin processing processes—such as extrusion, injection molding, blow molding, extrusion blow molding, injection blow molding, inflation molding, stamping molding, compression molding, beads molding and RIM molding—can be employed. The continuous plasticators and resin-plasticating cylinders, which are referred to herein, should be included in these forming machines. Further, the method of the present invention for the addition of supercritical carbon dioxide can also be used in a process for obtaining an expanded product after impregnating with carbon dioxide a thermoplastic resin in an autoclave.

Concerning the method of the present invention for the addition of supercritical carbon dioxide or the process of the present invention for the production of an expanded thermoplastic resin product, no particular limitation is imposed on the shapes of available products. For example, no limitation is imposed on the shapes of expanded thermoplastic resin products available from extrusion. Such expanded thermoplastic resin products therefore include sheets, plates, bars, pipes, tubes, circular cylinders, oval cylinders, strands, filaments, nets, profile extrusion products, multilayer extrusion products, and wire coatings.

With reference to FIG. 2, a description will be made about the process for the production of an expanded thermoplastic resin product by extrusion, which makes use of the method of the present invention for the addition of supercritical carbon dioxide.

A thermoplastic resin is charged into the first extruder 9, which makes up an inlet side of a continuous plasticator and is provided with a line through which a blowing agent is to be added to the resulting molten thermoplastic resin. While heating and melting the thermoplastic resin, carbon dioxide in a supercritical state is added, thereby forming a molten thermoplastic resin composition composed of the thermoplastic resin and the blowing agent in a mutually-dissolved state.

At this time, a predetermined amount of the carbon dioxide in the supercritical state is stably added by the above-mentioned method for the addition of carbon dioxide in a supercritical state. The pressure of the molten thermoplastic resin at this time may preferably be in the range of from the critical pressure (7.4 MPa) of carbon dioxide to 40 MPa.

The molten thermoplastic resin composition is then transferred to the second extruder 12 which makes up an outlet side of the continuous plasticator, and its temperature is gradually lowered to a level optimal for expansion. At this time, the pressure and temperature up to a free end portion of the second extruder 12 are required to be equal to or higher than the critical pressure and temperature of carbon dioxide so that the carbon dioxide is allowed to remain in a supercritical state there.

Preferably, the connecting member 11 between the first extruder 9 and the second extruder 12 is provided with an adapter having a mixing portion. This further promotes the mixing of the molten thermoplastic resin and carbon dioxide, thereby facilitating the formation of the thermoplastic resin and carbon dioxide into a mutually-dissolved state. Further, temperature control by the adapter makes it easier to cool the molten thermoplastic resin composition such that the resin composition has a viscosity suited for subsequent expansion.

No particular limitation is imposed on the type of the adapter having the mixing portion, but an adapter with a built-in static mixer can be suitably employed because the molten thermoplastic resin composition can be subjected to kneading and cooling there.

However, the continuous plasticator may not be needed to be in the form of a tandem expansion extruder making additional use of the second extruder 12 but may be composed of only one extruder, provided that in the first extruder 9, the molten thermoplastic resin composition can be sufficiently formed into a mutually-dissolved state and can also be cooled to the temperature optimal for expansion.

The molten thermoplastic resin composition is next transferred to the die 13 set at the temperature optimal for expansion and connected to the free end portion of the continuous plasticator, and is lowered in pressure to initiate expansion.

No particular limitation is imposed on the thermoplastic resin usable in the present invention insofar as it is a thermoplastic resin plasticizable in the forming machine 4. Illustrative of the thermoplastic resin are styrene resins (for example, polystyrene, butadiene-styrene copolymer, acrylonitrile-styrene copolymer, acrylonitrile-butadiene-styrene copolymer, etc.), ABS resin, polyethylene, polypropylene, ethylene-propylene resin, ethylene-ethyl acrylate resin, polyvinyl chloride, polyvinylidene chloride, polybutene, polycarbonates, polyacetals, polyphenylene oxide, polyvinyl alcohol, polymethyl methacrylate, saturated polyester resins (for example, polyethylene terephthalate, polybutylene terephthalate, etc.), biodegradable polyesters (for example, hydroxycarboxylic condensation products such as polylactic acid, diol-dicarboxylic acid condensation products such as polybutylene succinate, etc.), polyamide resins, polyimide resins, fluorinated resins, polysulfones, polyethersulfones, polyarylates, polyetheretherketones, liquid crystal polymers. They can be used either singly or in combination. Among these thermoplastic resins, styrene-base resins and polyolefin-base resins are preferred, with polystyrene, polypropylene and polyethylene being particularly preferred.

Further, the melt flow index of each thermoplastic resin as measured around its processing temperature may desirably fall within a range of from 0.05 to 60 g/10 minutes, preferably from 0.1 to 40 g/10 minutes, more preferably from 0.2 to 20 g/10 minutes or so. In this case, the measuring conditions, namely, the measuring temperature and load can be set using the conditions specified under the ASTM as indexes. For example, the measuring temperature and load can be set at 230° C. and 21.18 N for polypropylene and at 190° C. and 21.18 N for polyethylene. The other conditions can be set following the corresponding conditions prescribed under ASTM D1238.

A melt flow index around the lower limit of the above range or higher provides an adequate resin viscosity upon melting so that no excessive load is applied to an extruder 4 and the processing is facilitated. On the other hand, a melt flow index around the upper limit of the above range or lower allows the thermoplastic resin to retain viscosity sufficient to withstand a gas pressure during expansion so that a good appearance can be maintained without development of cell collapse. In accordance with these indexes, a melt index can be suitably chosen for a thermoplastic resin to be used.

Supercritical carbon dioxide which is useful as a blowing agent in the present invention may be used in a proportion of from 0.1 to 30 parts by weight, more preferably from 0.2 to 20 parts by weight per 100 parts by weight of the thermoplastic resin.

If the proportion of the blowing agent is smaller than 0.1 part by weight, no sufficient expansion ratio can be obtained. A proportion greater than 30 parts by weight leads to the occurrence of a large expansion force from the added carbon dioxide, resulting in an expanded product with a surface of blister-like defective external appearance. To form the thermoplastic resin into a desired shape under the large expansion force, the cooling step has to be made longer in time. This also requires a longer time for the production, so that the efficiency of production is reduced.

This carbon dioxide is required to be in a supercritical state within the molding machine in view of its solubility, penetrability, diffusibility and the like into the molten resin composition.

The present invention also permits combined use of one or more blowing agents of the thermal decomposition type with supercritical carbon dioxide. The blowing agents give off carbon dioxide or nitrogen upon thermal decomposition and act as expansion nucleating agents to make expansion uniform. Examples of blowing agents of the thermal decomposition type include azodicarbonamide, N,N-dinitrosopentatetramine, azobisisobutyronitrile, citric acid, and sodium hydrogencarbonate. When a blowing agent of the thermal decomposition type is used, it can be used in a proportion of from 0.01 to 10 parts by weight per 100 parts by weight of the thermoplastic resin.

To provide a resulting expanded product with a good surface appearance without cell collapse, one or more of various additives may be added to a thermoplastic resin for use in the present invention. As these additives, known additives employed in general expansion molding can be used. For example, aliphatic carboxylic acids and derivatives thereof can be used suitably.

Examples of the aliphatic carboxylic acids and derivatives thereof include aliphatic carboxylic acids, acid anhydrides, alkali metal salts, alkaline earth meal salts, and the like. As aliphatic carboxylic acids, aliphatic carboxylic acids having 3–30 carbon atoms are suited, for example, lauric acid, stearic acid, crotonic acid, oleic acid, maleic acid, glutaric acid, and montanic acid. From the viewpoints of the dispersibility and solubility in the resin and effects or the like in improving the surface appearance, stearic acid, derivatives of stearic acid, montanic acid and derivatives of montanic acid are preferred. Of these, alkali metal salts and alkaline earth metal salts of stearic acid, especially zinc stearate and calcium stearate are particularly preferred.

The proportion of such an additive may range from 0.01 to 10 parts by weight, preferably from 0.05 to 8 parts by weight, more preferably from 0.1 to 5 parts by weight, all per 100 parts by weight of the thermoplastic resin.

A proportion of the additive equal to or greater than 0.01 part by weight can easily prevent an expanded product from cell collapse, and a proportion of the additive equal to or smaller than 10 parts by weight allows the resin to retain a viscosity sufficient to withstand a gas pressure during expansion, thereby making it possible to provide an improved surface appearance without developing cell collapse.

As an additive to the thermoplastic resin, the present invention also permits use of fine inorganic powder which acts as an expansion nucleating agent. Examples of the fine inorganic powder include talc, calcium carbonate, clay, magnesium oxide, zinc oxide, glass beads, glass powder, titanium oxide, carbon black, and anhydrous silica. Among these, talc, calcium carbonate, titanium oxide and anhydrous silica are preferred, with talc being particularly preferred. Their particle sizes are required to be 50 μm or smaller, preferably 10 μm or smaller, more preferably 5 μm or smaller.

Use of a fine inorganic powder the particle size of which is 50 μm or smaller can provide an expanded product with a better surface appearance.

When a fine inorganic powder is used, its proportion may be in a range of from 0.01 to 40 parts by weight, preferably from 0.05 to 20 parts by weight, more preferably from 0.05 to 10 parts by weight, still more preferably from 0.1 to 5 parts by weight, all per 100 parts by weight of the thermoplastic resin.

When a fine inorganic powder is added in a proportion equal to or greater than 0.1 part by weight but equal to or smaller than 40 parts by weight, the resulting expanded product is provided with a good surface appearance. The addition of such a fine inorganic powder in the above range is therefore preferred.

To extents not impairing the characteristics of the present invention, the above-described resin composition can be added with additives or the like, which are other than the fine inorganic powder, aliphatic carboxylic acid and derivatives thereof exemplified above, as needed depending on the purpose and application field. These other additives and the like include resins such as various elastomers, styrene resins (for example, polystyrene, butadiene-styrene copolymer, acrylonitrile-styrene copolymer, acrylonitrile-butadiene-styrene copolymer, etc.), ABS resin, polyethylene, polypropylene, ethylene-propylene resin, ethylene-ethyl acrylate resin, polyvinyl chloride, polyvinylidene chloride, polybutene, polycarbonates, polyacetals, polyphenylene oxide, polyvinyl alcohol, polymethyl methacrylate, saturated polyester resins (for example, polyethylene terephthalate, polybutylene terephthalate, etc.), biodegradable polyesters (for example, hydroxycarboxylic condensation products such as polylactic acid, diol-dicarboxylic acid condensation products such as polybutylene succinate, etc.), polyamide resins, polyimide resins, fluorinated resins, polysulfones, polyethersulfones, polyarylates, polyetheretherketones and liquid crystal polymers and mixtures thereof; peroxides; sulfur; process oils; anti-block additives; plasticizers; pigments; stabilizers; fillers; and metal powders.

No particular limitation is imposed on the production method of the thermoplastic resin composition which is used as a raw material for the expanded thermoplastic resin product according to the present invention, and a conventionally known method can be adopted. For example, the thermoplastic resin composition can be prepared by forming the thermoplastic resin and the above-described additives into an intimate mixture with a high-speed stirrer or the like and then melting and kneading the resultant mixture with a single screw or multi-screw extruder, mixing roll, kneader, Brabender mixer or the like which has sufficient kneading ability.

As an alternative, the thermoplastic resin and the above-described additives can also be used in an intimately mixed state without inconvenience.

The gas dissolving step in the process of the present invention for the production of the expanded thermoplastic resin product by extrusion, in which the thermoplastic resin and supercritical carbon dioxide are formed into a mutually dissolved state, is a step in which, after the thermoplastic resin is heated and molten in the first extruder 9 which makes up the inlet side of a continuous plasticator, carbon dioxide is added in a supercritical state to the thus-molten resin by the above-mentioned method for the addition of supercritical carbon dioxide, and the resultant mixture is then formed into a uniform mixture.

The cooling step is a step in which the molten thermoplastic resin composition is cooled on the outlet side of the continuous plasticator such that its viscosity is adjusted to a level suited for expansion.

The cell nuclei forming step is a step in which the pressure of the molten thermoplastic resin composition is lowered to a level equal to or lower than the critical pressure of carbon dioxide at the die 13 to bring carbon dioxide into an over-saturated state and a number of cell nuclei are caused to occur in the over-saturated molten thermoplastic resin composition.

The expansion control step is a step in which the expanded sheet 15 is promptly cooled to the glass transition temperature or crystallization temperature of the resin or lower and growth of the cells so occurred is regulated to control the expansion ratio to a desired value.

Of these steps, at least the gas dissolving step and the cooling step are conducted following the methods described in the claims and examples of Japanese Patent Laid-Open No. 11190/1996, as will be described below.

A thermoplastic resin is fed from a hopper 8 into the first extruder 9 which makes up the inlet side of the continuous plasticator and is molten at a temperature equal to or higher than the melting point or plasticizing temperature of the thermoplastic resin. As the temperature at this time, the heating and melting are performed at 100 to 450° C. On the other hand, carbon dioxide is allowed to flow from a liquefied carbon dioxide cylinder 1 into a predetermined amount deliverable pump 2, where the carbon dioxide is compressed. The pressure-controlled carbon dioxide is then added into the molten thermoplastic resin within the first extruder 9.

At this time, the interior of the system is maintained above the critical pressure and critical temperature of the carbon dioxide in the extruder 9 so that the dissolution and diffusion of the carbon dioxide into the molten thermoplastic resin are substantially increased to permit its penetration into the thermoplastic resin in a short time.

Further, the carbon dioxide to be fed into the first extruder 9 is raised in temperature and pressure before it is fed to the extruder 9, so that the carbon dioxide is hence added after it is brought into a supercritical state.

In the first extruder 9, the molten thermoplastic resin and the carbon dioxide are kneaded by a screw 10 so that the thermoplastic resin and the carbon dioxide are formed into a mutually-dissolved state.

After the mutual dissolution, the temperature of the free end portion of the second extruder 12, which makes up the outlet side of the continuous plasticator, is cooled in the cooling step such that the molten thermoplastic resin composition is cooled to a temperature which is higher by 50° C. or less than the plasticizing temperature of the molten thermoplastic resin composition and is equal to or lower than the melting temperature of the thermoplastic resin in the gas dissolving step. As the temperature at this time, the molten thermoplastic resin composition is cooled to a temperature of from 50 to 300° C., preferably from 80 to 280° C. and equal to or higher than the plasticizing temperature of the molten thermoplastic resin composition so that its viscosity is adjusted to a level suited for subsequent expansion.

The second embodiment of the present invention will hereinafter be described with reference to FIGS. 1 to 2, in which there are shown the liquefied carbon dioxide cylinder 1, the predetermined amount deliverable pump 2, the hopper 8, the first extruder 9, the screw 10, the connecting member 11, the second extruder 12, the die 13, the mandrel 14, and the expanded sheet 15.

Reference is now had to FIG. 2. In the gas dissolving step, 100 parts by weight of a thermoplastic resin are fed from the hopper 8 into the first extruder 9, which makes up the inlet side of the continuous plasticator, and are then heated and molten. On the other hand, carbon dioxide is charged at a controlled temperature from the liquefied carbon dioxide cylinder 1 into the predetermined amount deliverable pump 2, where it is compressed to a preset pressure of the pressure control valve 3, and the pressure-controlled carbon dioxide is then fed in an amount of from 0.1 to 30 parts by weight into the molten thermoplastic resin composition within the first extruder 9 to perform the gas dissolving step. At this time, it is necessary to maintain the interior of the system above the critical pressure and critical temperature of the carbon dioxide so that the dissolution and diffusion of the carbon dioxide contained in the first extruder 9 into the molten thermoplastic resin are substantially increased to permit its penetration into the thermoplastic resin in a short time.

In the case of carbon dioxide, the critical pressure and critical temperature are 7.4 MPa and 31.35° C. Inside the first extruder 9, the pressure can be in a range of from 7.4 to 40 MPa, preferably from 10 to 30 MPa and the temperature can be in a range of from 100 to 450° C., preferably from 110 to 280° C.

Further, the carbon dioxide is raised in temperature and pressure before its addition and, after it is brought into a supercritical state, it is added to the molten thermoplastic resin within the first extruder 9.

In the first extruder 9, the molten thermoplastic resin and the supercritical carbon dioxide are kneaded by the screw 10 so that the thermoplastic resin and the supercritical carbon dioxide are formed into a mutually-dissolved state.

In the cooling step subsequent to the mutual dissolution, to increase the solubility of the carbon dioxide in the thermoplastic resin, the molten thermoplastic resin composition is charged into the second extruder 12, which makes up the outlet side of the continuous plasticator, and is gradually cooled to a temperature suited for expansion while a pressure equal to or higher than the critical pressure is maintained.

As the temperature at this time, cooling is effected at 50 to 300° C., preferably 80 to 280° C. while maintaining a temperature equal to or higher than the plasticizing temperature of the molten thermoplastic resin composition. The temperature should be adjusted such that the molten thermoplastic resin composition has a viscosity suitable for subsequent expansion.

This cooling step making use of the second extruder 12 is a step for bringing the molten thermoplastic resin composition close to temperature conditions suited for expansion without difficulties. Thorough cooling in this step makes it possible to produce expanded thermoplastic resin products continuously and stably. However, when production facilities in which the molten thermoplastic resin composition can be fully cooled to a temperature suited for expansion only by the first extruder 9 are used as the continuous plasticator, the connection of the second extruder 12 as the outlet side of the continuous plasticator is no longer needed, and expanded products can be produced by the first extruder 9 alone.

Further, to improve the state of dissolution of carbon dioxide in the molten thermoplastic resin composition, it is more preferred to connect kneading means, such as a static mixer, to the connecting member 11 between the first extruder 9 and the second extruder 12.

The molten thermoplastic resin composition is then transferred to the die 13 which is set at the temperature optimal for expansion and is connected to the outlet side of the continuous plasticator, and is caused to initiate expansion. The pressure of the molten thermoplastic resin composition is lowered under controlled conditions at an outlet of the die, so that carbon dioxide is brought into an over-saturated state.

The molten thermoplastic resin composition, in which carbon dioxide has been brought into the oversaturated state, is brought into a thermally unstable state, whereby a number of cells are formed. In general, the glass transition temperature of a gascontaining resin is known to lower in proportion to the amount of the impregnated gas. It is therefore preferred to set the internal temperature of the die 13 at a level equal to or higher than the glass transition temperature of the molten thermoplastic resin composition impregnated with carbon dioxide.

The molten thermoplastic resin composition, which has initiated expansion, is extruded through the outlet of the die 13.

As the expansion control step, the resulting expanded sheet 15 is passed through a cooling device such that the expanded sheet 15 is promptly cooled to the glass transition temperature or crystallization temperature of the thermoplastic resin or lower. This makes it possible to control the growth of the formed cells and hence to stably produce expanded thermoplastic resin products containing a number of unevenlydistributed, fine cells without irregular delivery. For example, the molten thermoplastic resin composition extruded from the circular die 13 initiates expansion concurrently with its delivery. By applying the delivered molten thermoplastic resin composition to the water-cooled cylindrical mandrel 14 arranged after the circular die 13, the resulting expanded product is formed into a cylindrical shape. After this expanded cylindrical product advances under cooling on and along the mandrel 14, it is cut by a cutter blade to obtain an expanded thermoplastic resin sheet.

In the present invention, it is necessary to always maintain a pressure of the critical pressure of the blowing agent or higher until the gas dissolving step and the cooling step are completed. Otherwise, the molten thermoplastic resin composition separates into the thermoplastic resin and the gas.

No particular limitation is imposed on the shapes of expanded thermoplastic resin products available from this process. Such expanded thermoplastic resin products therefore include sheets, circular rods, plates, bars, pipes, and the like.

Figure 3:
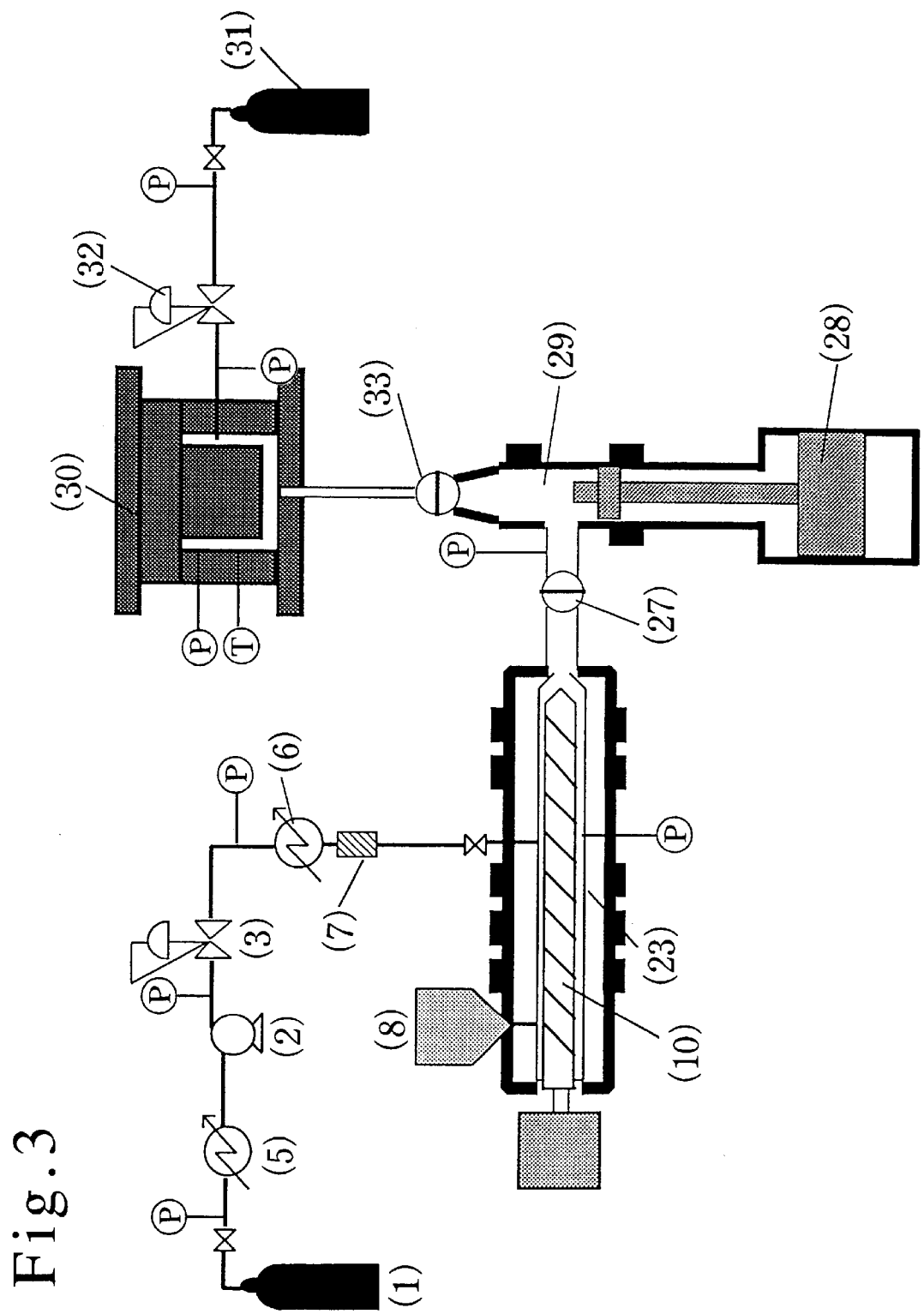
FIG. 3 is schematic construction diagram illustrating a process according to a second embodiment of the present invention for the production of an expanded thermoplastic resin product.

Referring to FIG. 3, a description will next be made about the process according to the second embodiment of the present invention for the production of an expanded thermoplastic resin product by extrusion, which makes use of the method of the present invention for the addition of supercritical carbon dioxide. To the resin-plasticating cylinder 23 equipped with a line through which a blowing agent is added to a molten thermoplastic resin, the injector 29 equipped with an injection plunger 28 is connected via the on-off valve 27. The thermoplastic resin is fed into the resin-plasticating cylinder 23 and, while heating and melting the resin, supercritical carbon dioxide is added by the above-mentioned method of this invention for the addition of supercritical carbon dioxide, whereby a molten thermoplastic resin composition is formed in a mutually-dissolved state.

The molten thermoplastic resin composition is then transferred to the injector 29 equipped with the injection plunger 28. Subsequent to the transfer, the on-off valve 27 is closed so that the resin-plasticating cylinder 23 and the injector 29 are isolated from each other. The resin-plasticating cylinder 23 continuously forms the molten thermoplastic resin composition without interruption even while the injector 29 is performing the metering and injection step.

Since the molten thermoplastic resin composition is not metered to the injector 29, the pressure within the resin-plasticating cylinder 23 arises. Because the mutually-dissolved state of the molten thermoplastic resin composition is not destroyed by the pressure rise, no problems arise by the continuation of the gas dissolving step and the cooling step. If any problem is however expected to arise in view of the withstandable pressure of the resin-plasticating cylinder 23, the apparatus can be modified without departing from the principle of the present invention in such a way that the molten thermoplastic resin composition can be discharged out of the system by operating the on-off valve 27.

On the other hand, the injector 29 performs injection after completion of the metering. In conventional injection molding machines, a back-pressure is once eliminated after the completion of the metering. In the present invention, however, a back-pressure is always kept applied from the beginning of metering until the end of the metering to avoid separation of the blowing agent and the thermoplastic resin from each other. The back-pressure at this time may be at least a pressure at which the blowing agent and the thermoplastic resin are prevented from separation, but anyhow, is required to be equal to or higher than the critical pressure of the blowing agent.

The molten thermoplastic resin composition formed in the resin-plasticating cylinder 23 is injected into the mold 30 without phase separation between the blowing agent and the thermoplastic resin.

Within the mold 30, the expansion controlling step is conducted by removing a high-pressure gas which has been filled in the mold 30 subsequent to the injection of the molten thermoplastic resin composition and/or by causing a portion or the entire portion of a core of the mold 30 to move backward.

Figure 4:
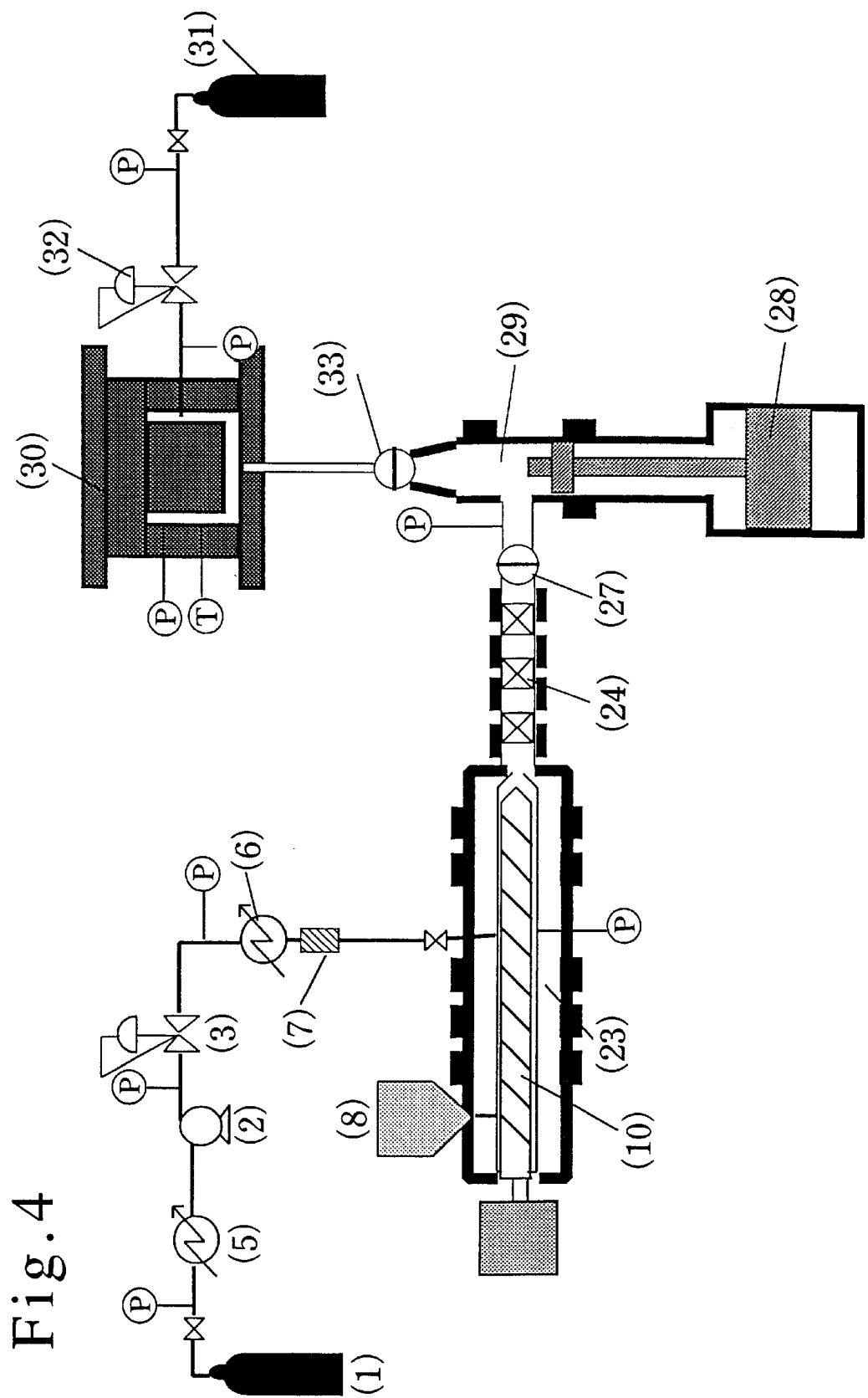
FIG. 4 is schematic construction diagram illustrating a process according to a third embodiment of the present invention for the production of an expanded thermoplastic resin product.

The third embodiment of the present invention is shown in FIG. 4. Between the resin-plasticating cylinder 23, which is equipped with the line through which a blowing agent is added to a molten thermoplastic resin, and the injector 29 equipped with the injection plunger 28, the adapter 24 having a mixing portion is arranged so that the adapter 24 is connected to the delivery line of the resin-plasticating cylinder 23, said delivery line being connected to the injector 29 via the on-off valve 27. The arrangement of the adapter 24 can further promote the mixing between the molten thermoplastic resin and the carbon dioxide to facilitate the formation of the thermoplastic resin and the carbon dioxide into a mutually-dissolved state. Further, temperature control by the adapter 24 can facilitate to cool the molten thermoplastic resin composition such that the resin has a viscosity suited for the subsequent injection and expansion. No particular limitation is imposed on the adapter 24 having the mixing portion, but an adapter with a built-in static mixer can be suitably employed because it can perform kneading and cooling of the molten thermoplastic resin composition.

Figure 5:
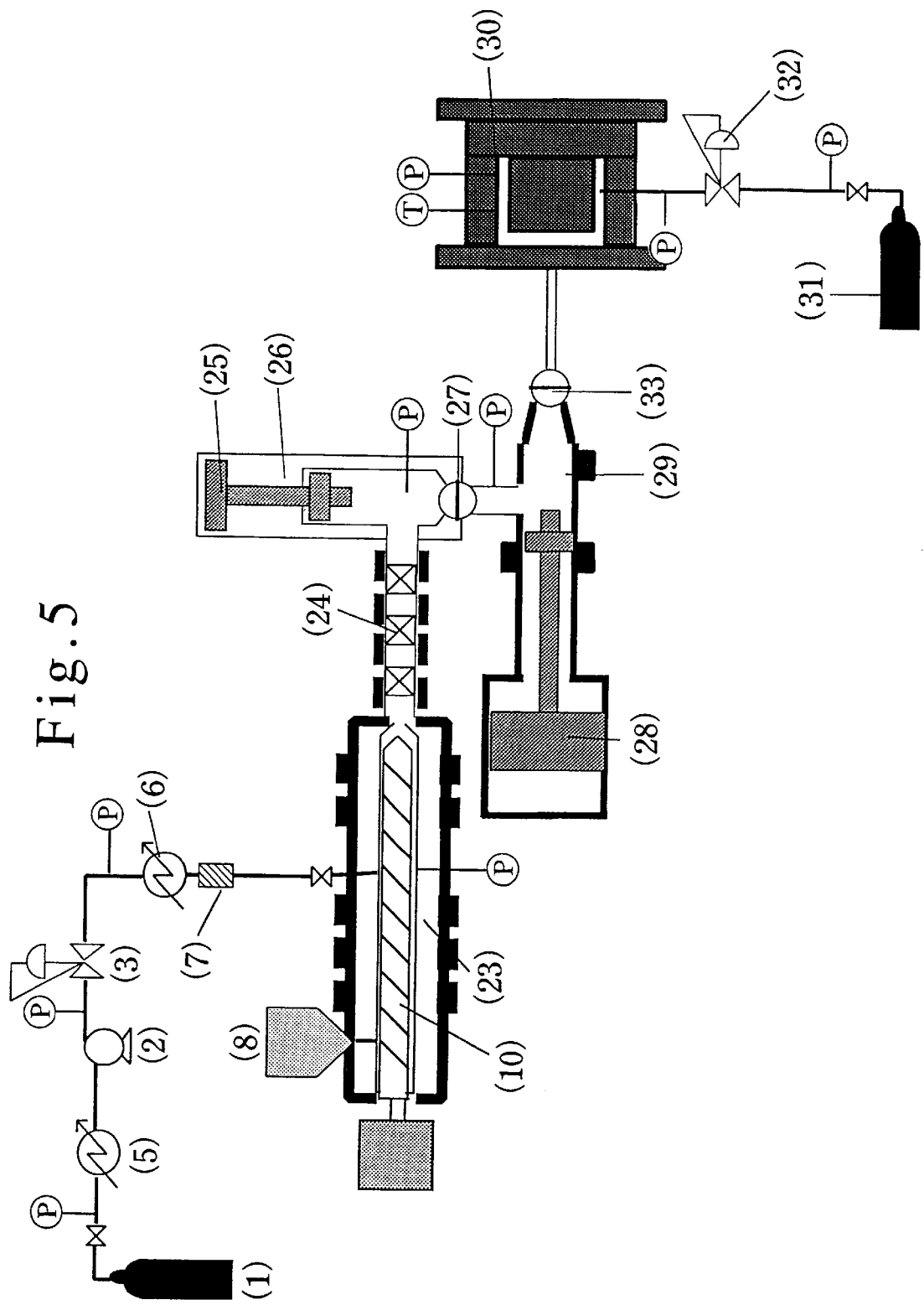
FIG. 5 is schematic construction diagram illustrating a process according to a fourth embodiment of the present invention for the production of an expanded thermoplastic resin product.

The fourth embodiment of the present invention is illustrated in FIG. 5. Before the injector 29 equipped with the injection plunger 28, the resin accumulator 26 equipped with a plunger is arranged so that the resin accumulator 26 is connected to the injector 29 via the on-off valve 27. After the on-off valve 27 has been turned off subsequent to completion of metering and while injection into the mold 30 is being performed by the injection plunger 28, the molten thermoplastic resin composition fed from the resin-plasticating cylinder 23 is fed to the resin accumulator 26 arranged immediately before the on-off valve 27. Owing to the flow-in of the molten thermoplastic resin composition, the plunger 25 of the resin accumulator 26 is caused to retreat. This control by the resin accumulator 26 makes it easier to maintain the interior of the apparatus system under a predetermined pressure. This in turn facilitates the maintenance of the molten thermoplastic resin composition in a mutually-dissolved state, thereby making it easier to form an expanded product with a good surface. The arrangement of the resin accumulator 26 is therefore preferred.

Figure 6:
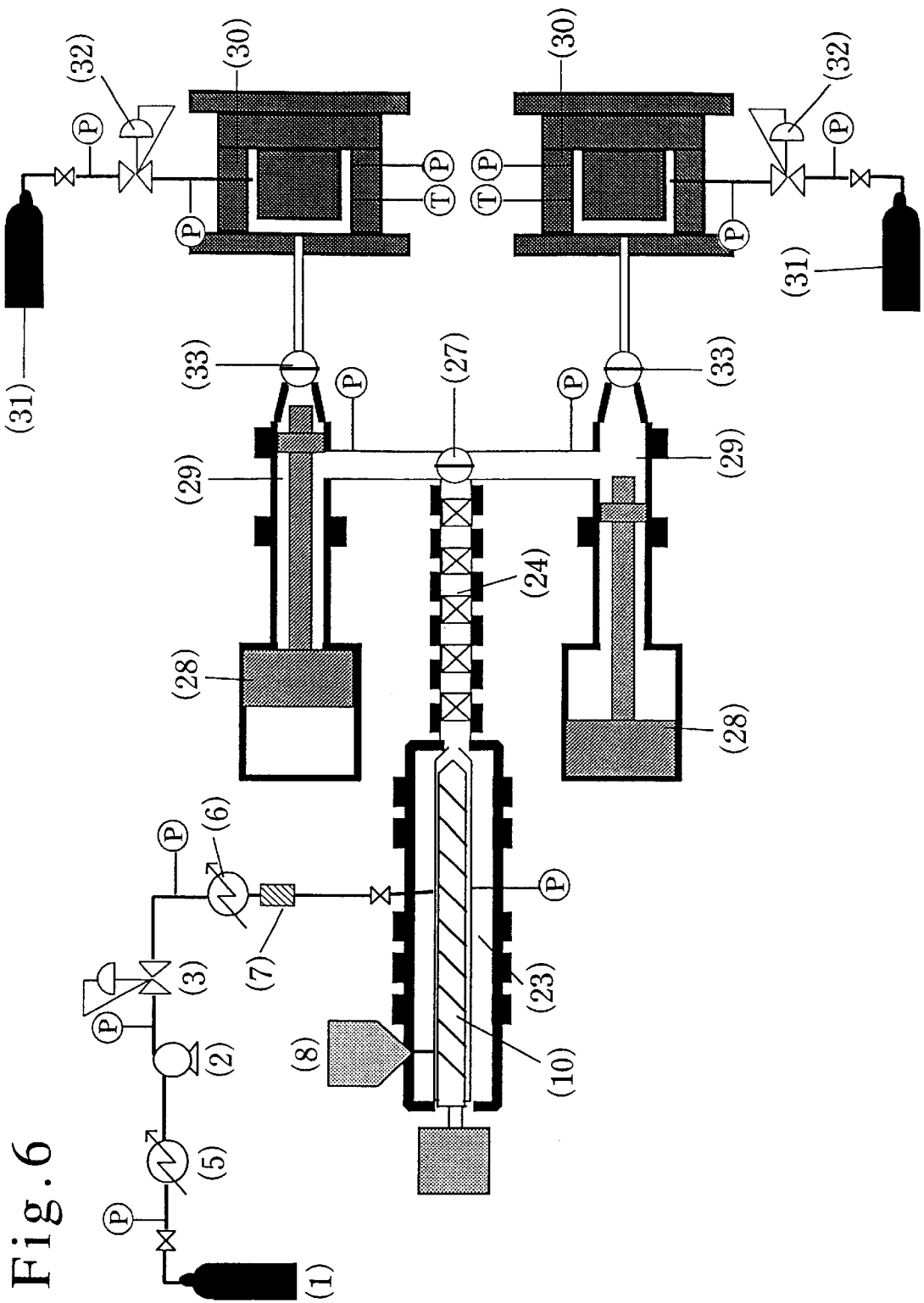
FIG. 6 is schematic construction diagram illustrating a process according to a fifth embodiment of the present invention for the production of an expanded thermoplastic resin product.

The fifth embodiment of the present invention is shown in FIG. 6. It is possible to arrange one more injector 29, which is also equipped with the injection plunger 28, in place of the resin accumulator 26 equipped with the plunger. This makes it easier to maintain the interior of the apparatus system under a predetermined pressure. This in turn facilitates the maintenance of the molten thermoplastic resin composition in a mutually-dissolved state, thereby making it easier to form an expanded product with a good surface. The arrangement of the additional injector 29 equipped with the injection plunger 28 is therefore preferred.

Figure 7:
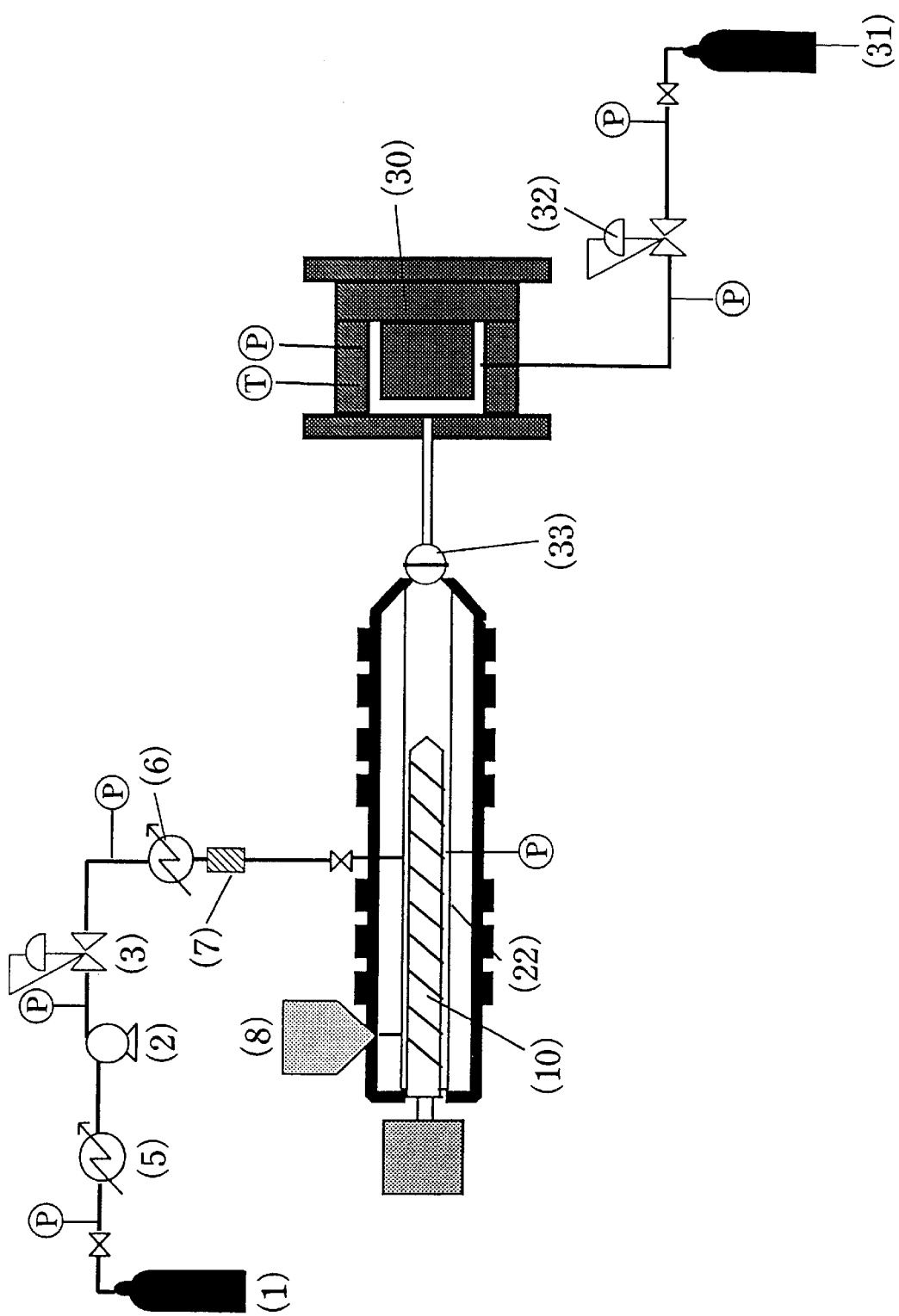
FIG. 7 is schematic construction diagram illustrating a process according to a sixth embodiment of the present invention for the production of an expanded thermoplastic resin product.

In the case of the injection molding machines shown in FIGS. 3 to 6 and composed of the resin-plasticating cylinders and the injectors isolated from each other, the internal pressure of the system can be easily maintained such that the thermoplastic resin and the blowing agent are prevented from separation from each other. The production of expanded thermoplastic resin products, which is an object of the present invention, can be achieved with ease. However, an injection molding machine of the in-line injection type such as that depicted in FIG. 7 can equally produce expanded thermoplastic resin products as in the present invention provided that the injection molding machine can keep a back-pressure applied through the gas dissolving step, the cooling step and the metering and injection step.

The gas dissolving step in the present invention, in which the mutually-dissolved state of the thermoplastic resin and supercritical carbon dioxide is formed, means a step in which, in the process according to the second embodiment of the present invention shown in FIG. 3 for the production of the expanded thermoplastic resin product, the thermoplastic resin is heated and molten in the resin-plasticating cylinder 23, supercritical carbon dioxide is added to the resulting molten thermoplastic resin by the abovementioned method of the present invention for the addition of supercritical carbon dioxide, and they are then mixed into a uniform composition.

The cooling step is a step in which the molten thermoplastic resin composition is cooled on the outlet side of the continuous plasticator such that its viscosity is adjusted to a level suited for expansion.

The gas dissolving step and the cooling step are conducted in the resin-plasticating cylinder 23 and the adapter 24 in the illustrative process shown in FIG. 4 for the production of the expanded product. Further, in the illustrative process depicted in FIG. 5 for the production of the expanded thermoplastic resin product, they are conducted in the resin-plasticating cylinder 23, the adapter 24 and the resin accumulator 26.

The metering and injection step is a step in which the molten thermoplastic resin composition, whose temperature has been controlled to give a viscosity suited for injection and expansion, is metered to the injector 29 and is then injected by the injection plunger 28. The expansion controlling step is a step in which the molten thermoplastic resin composition, which has been injected into the mold 30, is depressurized from a pressurized state to form cell nuclei and hence to control the expansion ratio. Of these steps, at least the gas dissolving step and the cooling step are conducted following the methods disclosed in Japanese Patent Laid-Open No. 11190/1996 as will be described below. These steps are described in Japanese Patent Laid-Open No. 11190/1996, the contents of which are incorporated herein by reference.

A thermoplastic resin is fed from a hopper 8 into the resin-plasticating cylinder 23 and is molten at a temperature equal to or higher than the melting point or plasticizing temperature of the thermoplastic resin. As the temperature at this time, the thermoplastic resin is heated and molten at 100 to 450° C. On the other hand, carbon dioxide is injected from the liquefied carbon dioxide cylinder 1 into the predetermined amount deliverable pump 2, where the carbon dioxide is compressed to a preset pressure of the pressure control valve 3, and the pressure-controlled carbon dioxide is then added into the molten thermoplastic resin within the resin-plasticating cylinder 23. At this time, the interior of the system should be maintained above the critical pressure and critical temperature of the carbon dioxide contained in the resin-plasticating cylinder 23 so that the dissolution and diffusion of the carbon dioxide into the molten thermoplastic resin are substantially increased to permit its penetration into the molten thermoplastic resin in a short time.

Further, the carbon dioxide is raised in temperature and pressure before it is added to the molten thermoplastic resin in the resin-plasticating cylinder 23 and, after it is brought into a supercritical state, it is added.

In the resin-plasticating cylinder 23, the molten thermoplastic resin and the carbon dioxide are kneaded by the screw 10 such that the thermoplastic resin and the carbon dioxide are formed into a mutually-dissolved state. After the mutual dissolution, the cooling step is conducted. By controlling the temperature of a free end portion of the resin-plasticating cylinder 23, the molten thermoplastic resin composition is cooled to a temperature which is higher by 50° C. or less than the plasticizing temperature of the molten thermoplastic resin composition and is equal to or lower than the melting temperature in the above-described gas dissolving step. As the temperature at this time, the molten thermoplastic resin composition is cooled to a temperature which is in a range of from 50 to 300° C., preferably from 80 to 280° C. and is equal to or higher than the plasticizing temperature of the molten thermoplastic resin composition so that the viscosity of the resin composition is adjusted to a level suited for subsequent injection and expansion.

The second to fifth embodiments of the present invention will hereinafter be described with reference to FIGS. 3 through 6, in which there are shown the liquefied carbon dioxide cylinder 1, the predetermined amount deliverable pump 2, the hopper 8, the screw 10, the in-line injection molding machine 22, the resin-plasticating cylinder 23, the adapter 24, the resin accumulator plunger 25, the resin accumulator 26, the on-off valve 27, the injection plunger 28, the injector 29, the mold 30, the gas cylinder 31, the pressure control valve 32, and the on-off valve 33.

Reference is now had to FIG. 3. In the gas dissolving step, 100 parts by weight of a thermoplastic resin are fed into the resin-plasticating cylinder 23 from the hopper 8 and are heated and molten. On the other hand, carbon dioxide is charged at a controlled temperature from the liquefied carbon dioxide cylinder 1 into the predetermined amount deliverable pump 2, where the carbon dioxide is pressurized to a preset pressure of the pressure control valve 3, and the pressure-controlled supercritical carbon dioxide is then added into the molten thermoplastic resin within the resin-plasticating cylinder 23 to perform the gas dissolving step. At this time, it is necessary to maintain the interior of the system above the critical pressure and critical temperature of the carbon dioxide contained in the resin-plasticating cylinder 23 so that the dissolution and diffusion of the carbon dioxide into the thermoplastic resin are substantially increased to permit its penetration into the thermoplastic resin in a short time.

In the case of carbon dioxide, the critical pressure and critical temperature are 7.4 MPa and 31.35° C. Inside the resin-plasticating cylinder 23, the pressure can be in a range of from 7.5 to 40 MPa, preferably from 10 to 30 MPa and the temperature can be in a range of from 100 to 450° C., preferably from 110 to 280° C.

Further, carbon dioxide, as a blowing agent, is raised in temperature and pressure before it is added to the molten thermoplastic resin in the resin-plasticating cylinder 23 and, after it is brought into a supercritical state, it is added.

In the resin-plasticating cylinder 23, the molten thermoplastic resin and the carbon dioxide are kneaded by the screw 10 such that the thermoplastic resin and the carbon dioxide are formed into a mutually-dissolved state. After the mutual dissolution, the cooling step is conducted. By controlling the temperature of the free end portion of the resin-plasticating cylinder 23, the molten thermoplastic resin composition is cooled to a temperature which is in a range of from 50 to 300° C., preferably from 80 to 280° C. and is equal to or higher than the plasticizing temperature of the molten thermoplastic resin composition so that the viscosity of the resin composition is adjusted to a level suited for the subsequent injection and expansion.

In the metering and injection step, the molten thermoplastic resin composition, whose temperature has been controlled to have a viscosity suited for injection and expansion, is fed to the injector 29 connected via the on-off valve 27 and equipped with the injection plunger 28. When the on-off valve 27 is open, the molten thermoplastic resin composition flows into the injector 29 to cause the injection plunger 28 to move backward so that metering is effected.

In a conventional injection molding machine, a back-pressure becomes no longer applied immediately after the completion of the metering irrespective of its type such as the in-line screw type or the plunger type. In the present invention, it is however necessary to continue the application of a back-pressure and the control of the internal pressure of the system until the end of injection so that the molten thermoplastic resin composition is prevented from separation into the blowing agent and the thermoplastic resin and also from expansion within the injector 29 during this time. The back-pressure during this time is required to be equal to or higher than the critical pressure of carbon dioxide, although the back-pressure may be sufficient it can maintain a minimum pressure for preventing the molten thermoplastic resin composition from separation into the blowing agent and the thermoplastic resin and also from expansion. Until the series of steps, that is, the gas dissolving step, the cooling step and the metering and injection step are completed, it is necessary to always maintain a pressure such that the molten thermoplastic resin composition is prevented from separating into the thermoplastic resin and the gas.

After the completion of the metering, the on-off valve 27 is turned off and injection into the mold 30 is then conducted by the injection plunger 28. By sucking back the injection plunger 28 prior to performing the injection subsequent to the metering, the internal pressure of the injector 29 can be slightly lowered to induce the formation of cell nuclei. This method can also be employed suitably.

Into the mold 30 shortly before the injection, a high-pressure gas which has been fed from the gas cylinder 31 or a compressor pump via the pressure control valve 32 is filled to a predetermined pressure. For example, when nitrogen is used as a high-pressure gas, its pressure can preferably be equal to or higher than the critical pressure of carbon dioxide employed as a blowing agent.

The advance filling of the mold with the high-pressure gas assures expansion-free filling of the mold with the molten thermoplastic resin composition injected into the mold, thereby providing the resulting expanded product with a good surface appearance.

In the expansion controlling step, the molten thermoplastic resin composition which is composed of the thermoplastic resin and the carbon dioxide in the mutually-dissolved state is injected into the mold 30 filled with the high-pressure gas. After the injection, the high-pressure gas filled in the mold 30 is rapidly released so that an abrupt pressure drop takes place inside the mold 30. By this step, the gas with which the thermoplastic resin is impregnated is brought into an over-saturated state, whereby numerous cell nuclei are formed.

As a method for developing an abrupt pressure drop inside the mold 30, there is also a suitably usable method in which the molten thermoplastic resin composition which is composed of the thermoplastic resin and the carbon dioxide in the mutually-dissolved state is injected into the mold 30, a portion or the entire portion of a core is caused to move backward, and the internal capacity of the mold 30 is hence abruptly increased to develop an abrupt pressure drop within the mold 30.

The expansion ratio can be controlled by the temperature of the mold 30, the internal pressure of the mold 30 and the backward stroke of the core inside the mold. An expanded thermoplastic product of a desired expansion ratio can therefore be obtained.

A sufficient effect for expansion ratio can be obtained by using either one of these control methods for expansion, however, there exists no problem if one uses these control methods at the same time.

As is shown in FIG. 4, the adapter 24 having the mixing portion is arranged between the resin-plasticating cylinder 23 equipped with the line through which the blowing agent is added to the molten thermoplastic resin, and the injector 29, which is equipped with the injection plunger 28, so that the adapter 24 is connected to the delivery line of the resin-plasticating cylinder 23, said delivery line being connected to the injector 29 via the on-off valve 27. The arrangement of the adapter 24 can further promote the mixing between the molten thermoplastic resin and the carbon dioxide to facilitate the formation of the thermoplastic resin and the carbon dioxide into a mutually-dissolved state. Further, temperature control by the adapter 24 can facilitate to cool the molten thermoplastic resin composition such that the resin composition has a viscosity suited for the subsequent injection and expansion and the gas dissolving step and the cooling step can be conducted with ease. The arrangement of the adapter 24 is therefore preferred. No particular limitation is imposed on the adapter 24 having the mixing portion, but an adapter with a built-in static mixer can be suitably employed because kneading and cooling of the molten thermoplastic resin can be effected.

As is illustrated in FIG. 5, the resin accumulator 26 equipped with the plunger 25 is arranged before the injector 29 equipped with the injection plunger 28, so that the resin accumulator 26 is connected to the injector 29 via the on-off valve 27. After the on-off valve 27 has been turned off subsequent to completion of metering and while injection into the mold 30 is being performed by the injection plunger 28, the molten thermoplastic resin composition fed from the resin-plasticating cylinder 23 is fed to the resin accumulator 26 arranged immediately before the on-off valve 27. Owing to the flow-in of the molten thermoplastic resin composition, the plunger of the resin accumulator 26 is caused to move backward. This control of the resin accumulator 26 makes it easier to maintain the interior of the apparatus system under a predetermined pressure. This in turn facilitates the maintenance of the molten thermoplastic resin composition in a mutually-dissolved state, thereby providing an expanded product with a good surface appearance. The arrangement of the resin accumulator 26 is therefore preferred.

As is depicted in FIG. 6, it is possible to arrange the additional injector 29, which is also equipped with the injection plunger 28, in place of the resin accumulator 26 equipped with the plunger (FIG. 5). This makes it easier to maintain the interior of the apparatus system under a predetermined pressure. This in turn facilitates the maintenance of the molten thermoplastic resin composition in a mutually-dissolved state, thereby providing an expanded product with a good surface appearance. The arrangement of the additional injector 29 equipped with the injection plunger 28 is therefore preferred.

In the case of the injection molding machines shown in FIGS. 3 to 6 and composed of the resin-plasticating cylinders and the injectors isolated from each other, the internal pressure of the system can be easily maintained such that the thermoplastic resin and the blowing agent are prevented from separation from each other. The production of expanded thermoplastic resin products, which is an object of the present invention, can be achieved with ease. However, an injection molding machine of the in-line injection type such as that depicted in FIG. 7 can equally produce expanded thermoplastic resin products as in the present invention provided that the injection molding machine can keep a back-pressure applied through the gas dissolving step, the cooling step and the metering and injection step.

Owing to the method of the present invention for the addition of supercritical carbon dioxide, it has become possible to stably add a predetermined amount of carbon dioxide into the forming machine and hence to form expanded thermoplastic resin products, which contain uniform cells and are free of uneven expansion, with uniform quality by injecting liquefied carbon dioxide in a liquefied state into the predetermined amount deliverable pump 2, maintaining the volumetric efficiency of the predetermined amount deliverable pump 2 such that it remains constant within the range of from 60% to 95%, controlling the delivery pressure of the predetermined amount deliverable pump 2 by providing the pressure control valve 3 such that it remains constant within the range of from the critical pressure (7.4 MPa) of carbon dioxide to 40 MPa, delivering the carbon dioxide, heating the thus-delivered carbon dioxide to the critical temperature (31° C.) of carbon dioxide or higher to convert it into supercritical carbon dioxide and then adding the supercritical carbon dioxide into the forming machine 4 and further by setting beforehand the pressure of the molten resin in the carbon dioxide adding section of the forming machine 4 to the critical pressure (7.4 MPa) of carbon dioxide or higher.

According to the process of the present invention for the production of an expanded thermoplastic product by extrusion, a predetermined amount of supercritical carbon dioxide, as a blowing agent, can be added stably at a constant rate to a molten thermoplastic resin. Expanded thermoplastic resin products ranging from high-density expanded products to low-density expanded products can therefore be produced with uniform quality by adding supercritical carbon dioxide to the molten thermoplastic resin within the first extruder 9 making up the inlet side of the continuous plasticator, thoroughly kneading the supercritical carbon dioxide and the molten thermoplastic resin to bring them into a mutually-dissolved state, lowering the temperature of the resultant molten thermoplastic resin composition at the outlet side of the continuous plasticator while maintaining the supercritical state, abruptly lowering the pressure under control to initiate expansion, and controlling the expansion ratio by a cooling device.

Further, according to the process of the present invention for the production of an expanded thermoplastic resin product by injection molding, a predetermined amount of supercritical carbon dioxide, as a blowing agent, can be added stably at a constant rate to a molten thermoplastic resin. Carbon dioxide is therefore added to the molten thermoplastic resin within the resin-plasticating cylinder 23, the carbon dioxide and the molten thermoplastic resin are thoroughly mixed to bring them into a mutually-dissolved state, and the resulting molten thermoplastic resin composition is then metered and injected into the injector 29. During these steps a back-pressure is kept applied, so that the formation of the molten thermoplastic resin composition into a mutually-dissolved state and the retention of the mutually-dissolved state of the molten thermoplastic resin composition are facilitated. Each expanded product is therefore provided with a good surface appearance. It is therefore possible to produce expanded thermoplastic resin products, which may range from high-density expanded products to low-density expanded products, with uniform quality.

The present invention will hereinafter be described by Examples. It is however to be noted that the contents of the present invention shall not be limited to the Examples.

Figure 8:
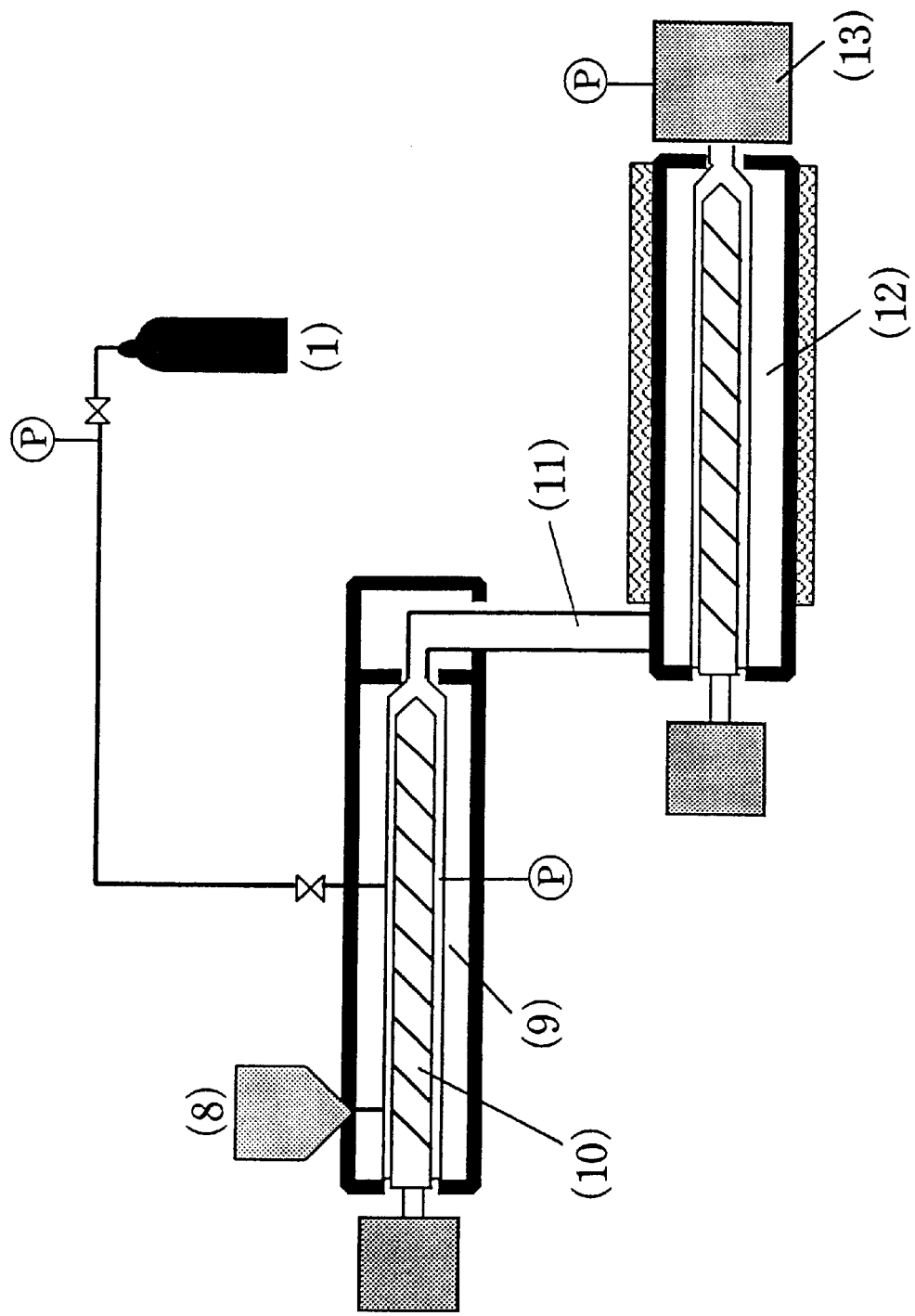
FIG. 8 is a schematic construction diagram illustrating a production process of an expanded thermoplastic resin product in Comparative Example 4.
Figure 9:
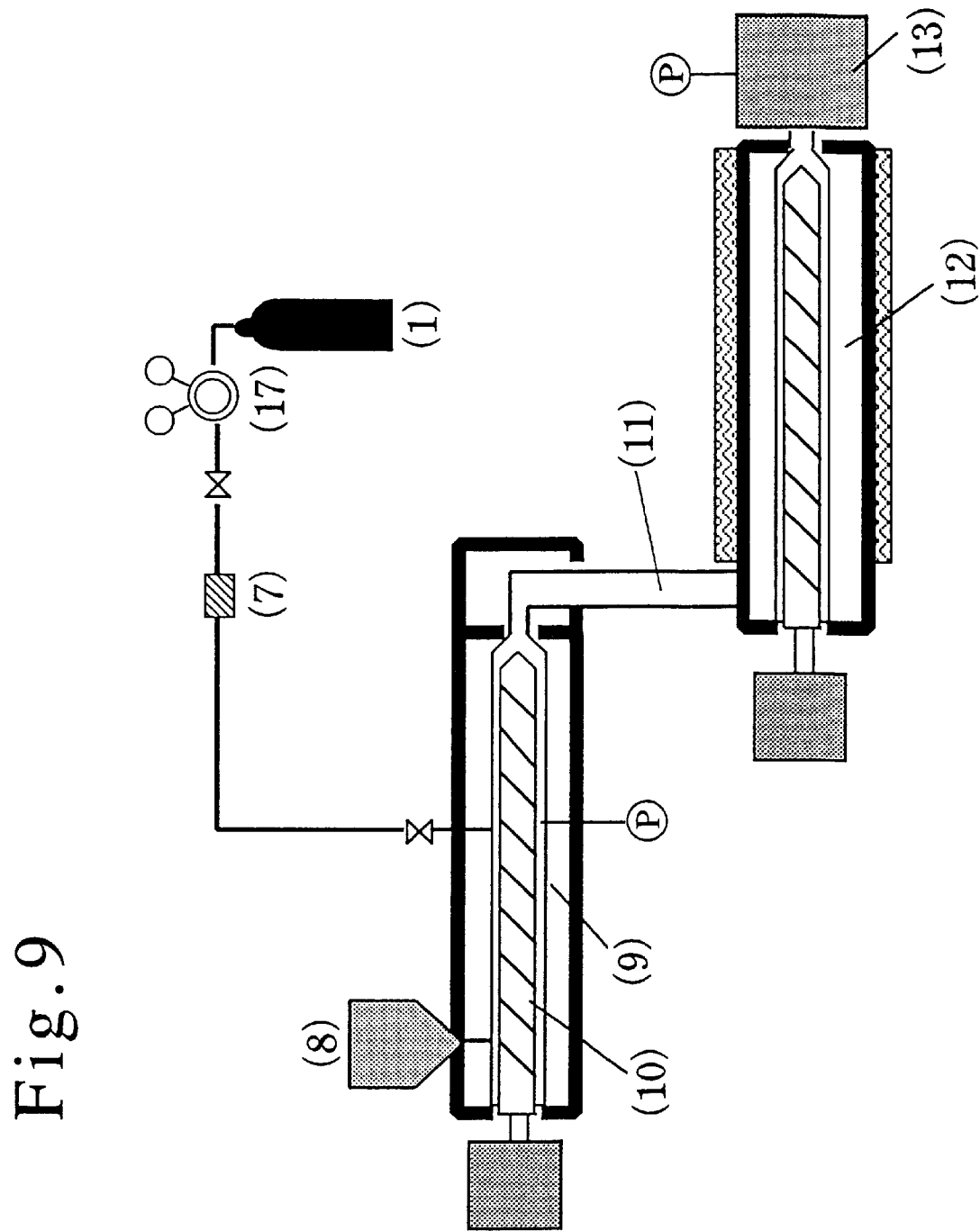
FIG. 9 is a schematic construction diagram illustrating a production process of an expanded thermoplastic resin product in Comparative Example 5.
Figure 10:
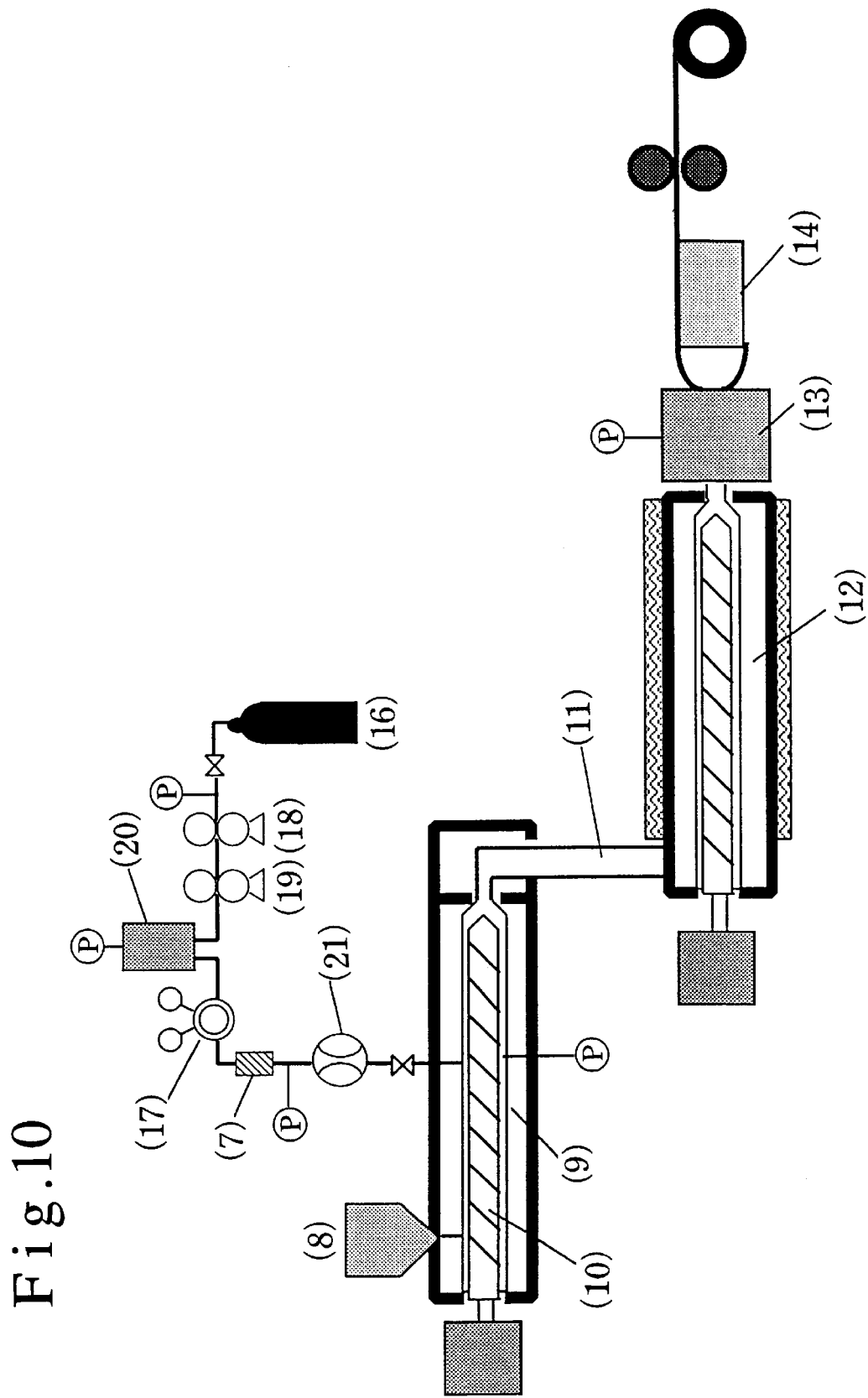
FIG. 10 is a schematic construction diagram illustrating a production process of an expanded thermoplastic resin product in Comparative Example 6.

FIG. 1 is the schematic construction diagram illustrating the method according to the embodiment of the present invention for the addition of supercritical carbon dioxide;

FIGS. 2 to 7 are the schematic construction diagrams illustrating the processes according to the first to sixth embodiments of the present invention for the production of expanded thermoplastic resin products;

FIG. 8 is the schematic construction diagram illustrating the production process of expanded thermoplastic resin products in Comparative Example 4;

FIG. 9 is the schematic construction diagram illustrating the production process of expanded thermoplastic resin products in Comparative Example 5; and FIG. 10 is the schematic construction diagram illustrating the production process of expanded thermoplastic resin products in Comparative Example 6;

Incidentally, the evaluations of physical properties described in the Examples and Comparative Examples were conducted following the following methods, respectively.

1) Surface Appearance

When a surface of an expanded product was found to be smooth and uniform by visual observation, the expanded product was rated "A". When a surface of an expanded product was extremely defective, for example, due to inclusion of a blister-like swell, the expanded product was rated "B".

2) Expansion Ratio

The density of an expanded thermoplastic resin product the dimensions of which were 30 mm×30 mm was measured using an electronic density meter, and its ratio to the density of the raw material thermoplastic resin was calculated. A value rounded to one decimal was recorded as an expansion ratio.

3) Average cell diameter

An equivalent circle diameter of cells in an expanded product was calculated by subjecting a cross-sectional photograph of the expanded product, which had been taken by a scanning electron microscope, to image processing, and its value was recorded as an average cell diameter.

4) Dimensional Stability Under Heat

Using an expanded product of 60 mm×60 mm as a measurement sample and as a comparative sample, a commercial 10-fold expanded PS product having a cell diameter distribution of from 100 to 400 $\mu$m, they were immersed for 10 minutes in warm water of 80° C. After the immersion, they were left over for 2 hours in an environment of 23° C. and 50% humidity for conditioning. A dimension of the measurement sample was measured to determine the percentage of a dimensional change. The comparative sample was found to have shrunk by 0.73%. The measurement sample was rated "A" when its percentage of dimensional change was smaller than that of the comparative sample. Otherwise, it was rated "B".

5) Stable Productivity

In Examples 1–5 and Comparative Examples 1–8, extrusion expansion was conducted continuously for 8 hours, while in Examples 6–8 and Comparative Examples 9–12, injection expansion was performed continuously for 2 hours. Stable productivity was rated "A" when during the continuous expansion, no changes took place in the added amount of carbon dioxide and expansion ratio and resin pressure fluctuations in the carbon dioxide addition section remained below 1 MPa. Otherwise, it was rated "B".

EXAMPLE 1

Employed as the forming machine 4 was the tandem extruder shown in FIG. 2 and provided with the first extruder 9 having a screw diameter of 50 mm and a second extruder 12 having a screw diameter of 65 mm. A carbon dioxide adding section was arranged around a center of the first extruder. Used as a thermoplastic resin was a mixture which consisted of 100 parts by weight of polystyrene resin pellets ("NIPPON POLYSTY G69ON", trade name; product of Nippon Polystyrene K.K.) and 1.5 parts by weight of talc. The feed material was added through the hopper 8 to the first extruder 9, and was then heated and molten at 220° C.

A liquefied carbon dioxide cylinder 1 of the siphon type was used to permit supplying carbon dioxide directly from a liquid phase. Using the cooling medium circulator 5, the flow line from the liquefied carbon dioxide cylinder 1 to the plunger pump 2 was cooled with an aqueous ethylene glycol solution controlled at −12° C., thereby making it possible to charge carbon dioxide in a liquefied state into the plunger pump 2. At that time, the temperature of the carbon dioxide was −5° C. The plunger pump 2 was then controlled such that the adding rate of the thus-charged liquefied carbon dioxide became 1 kg/hour, and the delivery pressure of the plunger pump 2 was adjusted to 30 MPa by the pressure control valve 3. At that time, the volumetric efficiency of the plunger pump 2 became constant at 65%. The line, which extended from the pressure control valve 3 to the carbon dioxide adding section of the first extruder 9, was then heated by a heater such that its temperature remained at 50° C., and carbon dioxide was added to the molten polystyrene in the first extruder 9. At that time, the pressure of the molten polystyrene in the carbon dioxide adding section was 20 MPa. Namely, the carbon dioxide immediately before its dissolution in the molten polystyrene was carbon dioxide in a supercritical state that its temperature was 50° C. or higher and its pressure was 20 MPa.

In the manner as described above, the supercritical carbon dioxide was added to the first extruder 9 in a proportion of 5 parts by weight per 100 parts by weight of the molten polystyrene, and they were mixed by the screw 10 into an intimate mixture. The mixture was then fed to the second extruder 12, where the mixture was heated to a resin temperature of 150° C. and then extruded at a delivery rate of 20 kg/hour through the die 13. At that time, the pressure of the die 13 was 19 MPa. As the die 13, a circular die 13 having an outlet gap of 0.5 mm and a diameter of 80 mm was used. The extruded polystyrene underwent expansion concurrently with its coming out of the die 13, and was applied on the water-cooled cylindrical mandrel 14 arranged after the die 13. After the resulting expanded polystyrene, which has been formed into a cylindrical shape, is caused to advance along the mandrel 14 while being cooled, it was cut open by a cutter blade to provide an expanded polystyrene sheet. The thus-obtained expanded polystyrene sheet was 630 mm in width and 1.5 mm in thickness, and its external appearance was smooth and beautiful. Evaluation results of the expanded product are shown in Table 1. It was an expanded product having a uniform average cell diameter, a good surface appearance and a high expansion ratio. Further, the expansion extrusion test was continued for 8 hours. It was possible to continue the expansion extrusion with uniform quality without changes in any of the added amount of carbon dioxide and the external appearance, dimensions and expansion ratio of the expanded sheet, although the resin pressure in the carbon dioxide adding section developed fluctuations within a range of 0.5 MPa due to disturbances such as differences in pellet biting and lot-to-lot variations.

EXAMPLE 2

This example was conducted in a similar manner as in Example 1 except that the plunger pump 2 was controlled to deliver liquefied carbon dioxide at 1.8 kg/hour. Supercritical carbon dioxide was added to the first extruder 9 in a proportion of 9 parts by weight per 100 parts by weight of molten polystyrene, and they were mixed by the screw 10 into an intimate mixture. The mixture was then fed to the second extruder 12, where the mixture was heated to a resin temperature of 120° C. and then extruded at a delivery rate of 20 kg/hour through the die 13. At that time, the pressure of the die 13 was 25 MPa. The thus-obtained expanded polystyrene sheet was 630 mm in width and 1.5 mm in thickness, and its external appearance was smooth and beautiful. Evaluation results of the expanded product are shown in Table 1. It was an expanded product having a uniform average cell diameter, a good surface appearance and a high expansion ratio. Further, the expansion extrusion test was continued for 8 hours. It was possible to continue the expansion extrusion with uniform quality without changes in any of the added amount of carbon dioxide and the external appearance, dimensions and expansion ratios of expanded sheets, although the resin pressure in the carbon dioxide adding section developed fluctuations within a range of 0.5 MPa due to disturbances such as differences in pellet biting and lot-to-lot variations.

EXAMPLE 3

This example was conducted in a similar manner as in Example 1 except that by using the cooling medium circulator 5, the flow line from the liquefied carbon dioxide cylinder 1 to the plunger pump 2 was cooled with an aqueous ethylene glycol solution controlled at −20° C. At that time, the temperature of the carbon dioxide was −10° C., and the volumetric efficiency of the plunger pump 2 became constant at 75%. The thus-obtained expanded polystyrene sheet was equivalent to that of Example 1. When the expansion extrusion test was continued for 8 hours, expansion was feasible with uniform quality as in Example 1.

EXAMPLE 4

This example was conducted in a similar manner as in Example 1 except that the delivery pressure of the plunger pump 2 was controlled to 25 MPa by the pressure control valve 3. At that time, the volumetric efficiency of the plunger pump 2 became constant at 70%. The thus-obtained expanded polystyrene sheet was equivalent to that of Example 1. When the expansion extrusion test was continued for 8 hours, expansion was feasible with uniform quality as in Example 1.

EXAMPLE 5

This example was conducted in a similar manner as in Example 1 except that the line from the pressure control valve 3 to the carbon dioxide adding section of the first extruder 9 was heated by a heater to 100° C. The thus-obtained expanded polystyrene sheet was equivalent to that of Example 1. When the expansion extrusion test was continued for 8 hours, expansion was feasible with uniform quality as in Example 1.

TABLE 1

|  | Example | | | | |
| --- | --- | --- | --- | --- | --- |
|  | 1 | 2 | 3 | 4 | 5 |
| Compressing method | Plunger pump | Plunger pump | Plunger pump | Plunger pump | Plunger pump |
| Temperature of carbon dioxide at pump inlet (° C.) | −5 | −10 | −12 | −7 | −5 |

TABLE 1-continued

|  | Example | | | | |
| --- | --- | --- | --- | --- | --- |
|  | 1 | 2 | 3 | 4 | 5 |
| Cooling temperature between carbon dioxide cylinder and pump (° C.) | −12 | −12 | −20 | −12 | −12 |
| Delivery pressure of pump (MPa) | 30 | 30 | 30 | 25 | 30 |
| Volumetric efficiency of pump (%) | 65 | 65 | 75 | 70 | 65 |
| Temperature beteen pressure control valve and extruder (° C.) | 50 | 50 | 50 | 50 | 100 |
| Amount of added carbon dioxide (parts by weight) | 5.0 | 9.0 | 5.0 | 5.0 | 5.0 |
| Fluctuations of resin pressure in carbon dioxide adding section (MPa) | 0.5 | 0.5 | 0.5 | 0.5 | 0.5 |
| Sheet thickness (mm) | 1.5 | 2.0 | 1.5 | 1.5 | 1.5 |
| Surface appearance | A | A | A | A | A |
| Expansion ratio | 15.0 | 21.0 | 15.0 | 15.0 | 15.0 |
| Average cell diameter ($\mu$m) | 120 | 150 | 120 | 120 | 120 |
| Dimensional stability under heat | A | A | A | A | A |
| Stable productivity | A | A | A | A | A |

COMPARATIVE EXAMPLE 1

This comparative example was conducted in a similar manner as in Example 1 except that the expansion extrusion test was conducted at room temperature (23° C.) without cooling the flow line from the liquefied carbon dioxide cylinder 1 to the plunger pump 2. As carbon dioxide was fed in a gaseous state to the plunger pump 2, the plunger pump 2 developed full cavitation. The volumetric efficiency of the pump therefore dropped to 0%, so that addition of carbon dioxide to the first extruder 9 was practically impossible. It was therefore impossible to lower the resin temperature to the predetermined temperature. The resultant extrusion product was not found to have undergone any substantial expansion. Dimensional stability under heat was not measured accordingly.

COMPARATIVE EXAMPLE 2

This comparative example was conducted in a similar manner as in Example 1 except that the delivery pressure of the plunger pump 2 was controlled to 6 MPa by the pressure control valve 3. The pressure of the molten resin in the carbon dioxide adding section was 20 MPa at that time. As a result, the delivery pressure on the outlet side of the plunger pump 2 became 20 MPa. Namely, the carbon dioxide was delivered in such a condition that one cannot say the pressure was controlled uniformly by providing the pressure control valve 3. The thus-obtained expanded polystyrene sheet was 630 mm in width, and its external appearance was smooth and beautiful. A cross-section of the expanded product was observed under a scanning electron microscope. Uniform distribution of cells was observed. When the expansion extrusion test was continued for 5 hours, however, the resin pressure in the carbon dioxide adding section developed fluctuations within a range of 1 MPa. The thickness and density therefore varied in a range of from 1.4 mm to 1.5 mm and in a range of from 0.069 to 0.071 g/cm$^3$, respectively. It was hence unable to perform expansion with uniform quality over a long time.

COMPARATIVE EXAMPLE 3

This comparative example was conducted in a similar manner as in Example 1 except that the delivery pressure of the plunger pump 2 was controlled to 45 MPa by the pressure control valve 3. At that time, the volumetric efficiency of the plunger pump 2 varied in a range of from 55% to 60% and did not become stable. The plunger pump 2 was controlled in an attempt to add liquefied carbon dioxide at 1 kg/hour. However, the amount of added liquefied carbon dioxide did not become stable. As a result, supercritical carbon dioxide was added to the first extruder with its amount added to 100 parts by weight of molten polystyrene fluctuating in a range of 4.5 to 5 parts by weight per hour. The thus-obtained expanded polystyrene sheet was 630 mm in width, and its external appearance was smooth and beautiful. A cross-section of the expanded product was observed under a scanning electron microscope. Uniform distribution of cells was observed. When the expansion extrusion test was continued for 3 hours, however, the thickness and density varied in a range of from 1.4 mm to 1.6 mm and in a range of from 0.068 to 0.072 g/cm$^3$, respectively. In addition, the pressure in the carbon dioxide adding section and the pressure in the die both varied in a range of 1 MPa. It was hence unable to perform expansion with uniform quality over a long time.

COMPARATIVE EXAMPLE 4

This comparative example was conducted in a similar manner as in Example 1 except that, as is illustrated in FIG. 8, carbon dioxide was added to the first extruder 9 under a cylinder pressure (6 MPa) alone without compressing it by the plunger pump 2. As the resin pressure in the carbon dioxide adding section was 20 MPa, namely, was higher than the cylinder pressure, it was practically impossible to add carbon dioxide to the first extruder 9. It was therefore impossible to lower the resin temperature to the predetermined temperature. The resultant extrusion product was not found to have undergone any substantial expansion. Dimensional stability under heat was not measured accordingly.

COMPARATIVE EXAMPLE 5

In this comparative example, carbon dioxide was depressurized to 3.4 MPa through the pressure reducing valve 17 arranged at the outlet of the liquefied carbon dioxide cylinder 1 and was then added to the first extruder 9 via the direct mass flowmeter 7, as is depicted in FIG. 9. As the resin pressure in the carbon dioxide adding section was 20 MPa, namely, was higher than the cylinder pressure, it was practically impossible to add carbon dioxide to the first extruder 9. It was therefore impossible to lower the resin temperature to the predetermined temperature. The resultant extrusion product was not found to have undergone any substantial expansion.

COMPARATIVE EXAMPLE 6

This comparative example was conducted in a similar manner as in Example 1 except that, as is illustrated in FIG.

10, the carbon dioxide cylinder 16 of the type that carbon dioxide was fed from a gaseous phase was used in place of the liquefied carbon dioxide cylinder 1 of the siphon type. Carbon dioxide was compressed to 6.5 MPa through the first compressor 18 and then to 31 MPa through the second compressor 19, and was thereafter stored under a pressure of 31 MPa in the tank 20 controlled at 50° C. The carbon dioxide in the tank 20 was next caused to flow through the pressure reducing valve 17, whereby the carbon dioxide was depressurized to 27 MPa there. Watching the direct mass flowmeter 7, the carbon dioxide was adjusted to a flow rate of 1 kg/hour by means of the flow regulator 21 and was then added to the first extruder 9. However, the added amount did not become stable. As a result, carbon dioxide was added to the first extruder 9 with its amount added to 100 parts by weight of molten polystyrene fluctuating in a range of 4 to 6 parts by weight per hour. The thus-obtained expanded polystyrene sheet was 630 mm in width, and its external appearance was smooth and beautiful. A cross-section of the expanded product was observed under a scanning electron microscope. The cell diameter distribution was uneven. When the expansion extrusion test was continued for 1 hour, the thickness and density varied in a range of from 1.3 mm to 1.6 mm and in a range of from 0.062 to 0.072 g/cm$^3$, respectively. In addition, the pressure in the carbon dioxide adding section and the pressure in the die both varied in a range of 1 MPa. It was hence unable to perform expansion with uniform quality over a long time. Dimensional stability under heat was not measured accordingly.

a liquid phase. Using the cooling medium circulator 5, the flow line from the liquefied carbon dioxide cylinder 1 to the plunger pump 2 was cooled with an aqueous ethylene glycol solution controlled at −12° C., thereby making it possible to charge carbon dioxide in a liquefied state into the plunger pump 2. At that time, the temperature of the carbon dioxide was −5° C. The plunger pump 2 was then controlled such that the adding rate of the thus-charged liquefied carbon dioxide became 10 parts by weight per 100 parts by weight of the polystyrene resin, and the delivery pressure of the plunger pump 2 was adjusted to 30 MPa by the pressure control valve 3. At that time, the volumetric efficiency of the plunger pump 2 became constant at 65%. The line, which extended from the pressure control valve 3 to the carbon dioxide adding section of the resin-plasticating cylinder 23, was then heated by a heater such that its temperature remained at 50° C., and carbon dioxide was added to resin-plasticating cylinder 23. At that time, the pressure of the molten resin in the carbon dioxide adding section was 20 MPa. Namely, the carbon dioxide immediately before its dissolution in the molten polystyrene was carbon dioxide in a supercritical state that its temperature was 50° C. or higher and its pressure was 20 MPa.

In the manner as described above, supercritical carbon dioxide was added to the fully molten polystyrene. In the resin-plasticating cylinder 23, the carbon dioxide and the molten polystyrene were kneaded and dissolved together. The molten polystyrene was gradually cooled to 180° C., metered into the injector 29 set at 180° C., and then injected

TABLE 2

|  | Comparative Example | | | | | |
|---|---|---|---|---|---|---|
|  | 1 | 2 | 3 | 4 | 5 | 6 |
| Compressing method | Plunger pump | Plunger pump | Plunger pump | Not compressed | Not compressed | Compressor |
| Temperature of carbon dioxide at pump inlet (° C.) | 23 | −9 | −5 | — | — | — |
| Cooling temperature between carbon dioxide cylinder and pump (° C.) | 23 | −12 | −12 | — | — | — |
| Delivery pressure of pump (MPa) | — | 20[1] | 45 | — | — | — |
| Volumetric efficiency of pump (%) | 0 | 74–76 | 55–60 | — | — | — |
| Temperature beteen pressure control valve and extruder (° C.) | 50 | 50 | 50 | 50 | 50 | — |
| Amount of added carbon dioxide (parts by weight) | — | 4.8–5.2 | 4.5–5.0 | — | — | 4.0–6.0 |
| Fluctuations of resin pressure in carbon dioxide adding section (MPa) | — | 0.5 | 1.0 | — | — | 2.0 |
| Sheet thickness (mm) | — | 1.4–1.5 | 1.4–1.6 | — | — | 1.3–1.6 |
| Surface appearance | — | A | A | — | — | A |
| Expansion ratio | — | 14.8–15.2 | 14.6–15.4 | — | — | 14.6–16.2 |
| Average cell diameter (μm) | — | 120 | 110–120 | — | — | 100–200 |
| Dimensional stability under heat | —[2] | A[3] | A[3] | —[2] | —[2] | A[3] |
| Stable productivity | B | B | B | B | B | B |

[1]The setting pressure of the pressure control valve was 6 MPa.
[2]No sample was obtained for measurement.
[3]A section having a sheet thickness of 1.5 mm was chosen and used as a masurement sample.

EXAMPLE 6

Employed as the forming machine 4 was the resin-plasticating cylinder 23 shown in FIG. 3 and provided with the screw 10 having a bore diameter of 30 mm and an L/D ratio of 30. A carbon dioxide adding section was arranged around a center of the resin-plasticating cylinder 23. Used as a thermoplastic resin was a mixture which consisted of 100 parts by weight of polystyrene resin pellets ("NIPPON POLYSTY G690N", trade name; product of Nippon Polystyrene K.K.) and 1.5 parts by weight of talc. The feed material was added through the hopper 8 to the resin-plasticating cylinder 23, and was then heated and molten at 250° C.

A liquefied carbon dioxide cylinder 1 of the siphon type was used to permit supplying carbon dioxide directly from into the mold 30 set at 40° C. At that time, the mold 30 immediately before injection was filled with nitrogen gas under a pressure of 8 MPa. After completion of the injection, the nitrogen gas filled in the cavity 30 was released in 1 second and to adjust the expansion ratio to 10 times or so, the core of the mold 30 the dimensions of a cavity of which were 60×60×1 (thickness) mm was caused to move backward over 9 mm, whereby a flat plate (60 mm×60 mm×10 mm) was obtained as an expanded thermoplastic resin product.

Evaluation results of the expanded product are shown in Table 3. It was an expanded product having a uniform average cell diameter, a good surface appearance and a high expansion ratio. Further, the expansion injection test was continued for 2 hours. It was possible to continue the expansion injection with uniform quality without changes in any of the added amount of carbon dioxide and the external appearance, dimensions and expansion ratios of the expanded product, although the resin pressure in the carbon dioxide adding section developed fluctuations within a range of 0.5 MPa due to disturbances such as differences in pellet biting and lot-to-lot variations.

EXAMPLE 7

Following the procedures of Example 6 except that the backward stroke of the core of the mold 30 was set at 14 mm and the preset expansion ratio was changed to about 15 times, a flat plate (60 mm×60 mm×15 mm) was obtained as an expanded thermoplastic resin product.

Evaluation results of the expanded product are shown in Table 3. It was an expanded product having a uniform average cell diameter, a good surface appearance and a high expansion ratio. Further, the expansion injection test was continued for 2 hours. It was possible to continue the expansion injection with uniform quality without changes in any of the added amount of carbon dioxide and the external appearance, dimensions and expansion ratios of the expanded product, although the resin pressure in the carbon dioxide adding section developed fluctuations within a range of 0.5 MPa due to disturbances such as differences in pellet biting and lot-to-lot variations.

EXAMPLE 8

Following the procedures of Example 6 except that the backward stroke of the core of the mold 30 was set at 19 mm and the preset expansion ratio was changed to 20 times, a flat plate (60 mm×60 mm×20 mm) was obtained as an expanded thermoplastic resin product.

Evaluation results of the expanded product are shown in Table 3. It was an expanded product having a uniform average cell diameter, a good surface appearance and a high expansion ratio. Further, the expansion injection test was continued for 2 hours. It was possible to continue the expansion injection with uniform quality without changes in any of the added amount of carbon dioxide and the external appearance, dimensions and expansion ratios of the expanded product, although the resin pressure in the carbon dioxide adding section developed fluctuations within a range of 0.5 MPa due to disturbances such as differences in pellet biting and lot-to-lot variations.

TABLE 3

| | Example | | |
|---|---|---|---|
| | 6 | 7 | 8 |
| Compressing method | Plunger pump | Plunger pump | Plunger pump |
| Temperature of carbon dioxide at pump inlet (° C.) | −5 | −10 | −12 |
| Cooling temperature between carbon dioxide cylinder and pump (° C.) | −12 | −12 | −20 |
| Delivery pressure of pump (MPa) | 30 | 30 | 30 |
| Volumetric efficiency of pump (%) | 55 | 65 | 75 |
| Temperature beteen pressure control valve and extruder (° C.) | 50 | 50 | 50 |
| Amount of added carbon dioxide (parts by weight) | 10 | 10 | 10 |
| Fluctuations of resin pressure in carbon dioxide adding section (MPa) | 0.5 | 0.5 | 0.5 |
| Surface appearance | A | A | A |
| Expansion ratio | 10.0 | 15.0 | 20.0 |
| Average cell diameter ($\mu$m) | 100 | 130 | 180 |
| Dimensional stability under heat | A | A | A |
| Stable productivity | A | A | A |

COMPARATIVE EXAMPLE 7

This comparative example was conducted in a similar manner as in Example 6 except that an expansion injection test was conducted at room temperature (23° C.) without cooling the flow line from the liquefied carbon dioxide cylinder 1 to the plunger pump 2. As carbon dioxide was fed in a gaseous state to the plunger pump 2, the plunger pump 2 developed full cavitation. The volumetric efficiency of the pump therefore dropped to 0%, so that addition of carbon dioxide to the resin-plasticating cylinder 23 was practically impossible. It was therefore impossible to lower the resin temperature to the predetermined temperature. The resultant injection product was not found to have undergone any substantial expansion.

COMPARATIVE EXAMPLE 8

This comparative example was conducted in a similar manner as in Example 6 except that carbon dioxide was added to the resin-plasticating cylinder 23 under the cylinder pressure (6 MPa) alone without compressing it by the plunger pump 2. As the resin pressure in the carbon dioxide adding section was 20 MPa, namely, was higher than the cylinder pressure, it was practically impossible to add carbon dioxide to the resin-plasticating cylinder 23. It was therefore impossible to lower the resin temperature to the predetermined temperature. The resultant extrusion product was not found to have undergone any substantial expansion.

COMPARATIVE EXAMPLE 9

This comparative example was conducted in a similar manner as in Example 6 except that the carbon dioxide cylinder 16 of the type that carbon dioxide was fed from a gaseous phase was used in place of the liquefied carbon dioxide cylinder 1 of the siphon type. Carbon dioxide was compressed to 6.5 MPa through the first compressor 18 and then to 31 MPa through the second compressor 19, and was thereafter stored under a pressure of 31 MPa in the tank 20 controlled at 50° C. The carbon dioxide in the tank 20 was next caused to flow through the pressure reducing valve 17, whereby the carbon dioxide was depressurized to 27 MPa there. Watching the direct mass flowmeter 7, the carbon dioxide was added to the resin-plasticating cylinder 23 while the carbon dioxide was adjusted by means of the flow regulator 21 such a flow rate that carbon dioxide amounts to 10 parts by weight based on the polystyrene resin. However, the added amount did not become stable. As a result, carbon dioxide was added to the resin-plasticating cylinder 23 with its amount added to 100 parts by weight of molten polystyrene fluctuating in a range of 8 to 11 parts by weight per hour.

The thus-obtained expanded product had a good surface appearance. When the expansion injection test was continued for 1 hour, however, the resin pressure in the carbon dioxide adding section fluctuated within a range of 1 MPa. It was hence unable to perform expansion with uniform quality.

TABLE 4

| Compressing method | Comparative Example | | |
|---|---|---|---|
| | 7 Plunger pump | 8 Not compressed | 9 Compressor |
| Temperature of carbon dioxide at pump inlet (° C.) | 23 | — | — |
| Cooling temperature between carbon dioxide cylinder and pump (° C.) | 23 | — | — |
| Delivery pressure of pump (MPa) | — | — | — |
| Volumetric efficiency of pump (%) | 0 | — | — |
| Temperature beteen pressure control valve and extruder (° C.) | 50 | 50 | — |
| Amount of added carbon dioxide (parts by weight) | — | — | 8–11 |
| Fluctuations of resin pressure in carbon dioxide adding section (MPa) | — | — | 1.0 |
| Surface appearance | — | — | A |
| Expansion ratio | — | — | 9.8–10.8 |
| Average cell diameter (μm) | — | — | 100–200 |
| Dimensional stability under heat | —[2] | —[2] | A[4] |
| Stable productivity | B | B | B |

[2] No sample was obtained for measurement.
[4] An expanded product having an expansion ratio of 10 times was chosen and used as a measurement sample.

Use of the present invention has made it possible to stably add a predetermined amount of carbon dioxide at a constant rate to a molten thermoplastic resin in the forming machine 4. As a result, expanded thermoplastic resin products ranging from high-density expanded products to low-density expanded products can be produced with uniform quality. Further, the amount of carbon dioxide to be added can be freely controlled with ease so that expanded products ranging from high-density expanded products to low-density expanded products can be produced. Moreover, owing to the use of carbon dioxide as a substitute for conventional flon or butane, the present invention is free of environmental problems such as air pollution and destruction of the ozonosphere and is also excellent in safety.

What is claimed is:

1. A method for the addition of supercritical carbon dioxide to a molten thermoplastic resin, which comprises charging carbon dioxide from a liquefied carbon dioxide cylinder (1) into a predetermined amount deliverable pump (2) while allowing said carbon dioxide to remain in a liquefied state, delivering said carbon dioxide from said predetermined amount deliverable pump (2) in such a manner that, when said carbon dioxide is pressurized and delivered by said predetermined amount deliverable pump (2), a delivery pressure is controlled at an optional pressure in a range of from a critical pressure (7.4 MPa) of carbon dioxide to 40 MPa to deliver said carbon dioxide without any fluctuation of the amount of the delivery by setting up the pressure of a pressure control valve (3), heating said carbon dioxide to a critical temperature (31° C.) of carbon dioxide or higher to convert said carbon dioxide into supercritical carbon dioxide, and then adding said supercritical carbon dioxide to said molten thermoplastic resin into a forming machine.

2. The method of claim 1, wherein upon adding said supercritical carbon dioxide to said molten thermoplastic resin, a pressure of said molten thermoplastic resin in a carbon dioxide adding section of a forming machine (4) has been raised beforehand to a pressure equal to or higher than the critical pressure (7.4 MPa) of carbon dioxide.

3. The method of claim 2, wherein said liquefied carbon dioxide to be charged from said liquefied carbon dioxide cylinder (1) into said predetermined amount deliverable pump (2) is controlled such that said liquefied carbon dioxide has a constant temperature in a range of from −30 to 15° C. at an inlet of said predetermined amount deliverable pump (2).

4. The method of claim 3, wherein a flow line from said liquefied carbon dioxide cylinder (1) to said predetermined amount deliverable pump (2) is cooled by a cooling medium circulator in which a cooling medium is controlled at a constant temperature in a range of from −60 to 0° C.

5. The method of claim 4, wherein said predetermined amount deliverable pump (2) is controlled to have a constant volumetric efficiency in a range of from 60 to 95%.

6. The method of claim 5, wherein said liquefied carbon dioxide cylinder (1) is a siphon cylinder.

7. A process for the production of an expanded thermoplastic resin product, said process comprising:
(i) as a gas dissolving step, melting a thermoplastic resin at a temperature equal to or higher than a melting point or plasticizing temperature of said thermoplastic resin in a continuous plasticator equipped with a feed line through which a blowing agent is added to the molten thermoplastic resin, adding carbon dioxide in a proportion of from 0.1 to 30 parts by weight per 100 parts by weight of said thermoplastic resin, and forming a molten thermoplastic resin composition in which said thermoplastic resin and said carbon dioxide are in a mutually-dissolved state;
(ii) as a cooling step, cooling said molten thermoplastic resin composition to a temperature, which is equal to or higher than a plasticizing temperature of said molten thermoplastic resin composition, is higher by 50° C. or less than said plasticizing temperature of said molten thermoplastic resin composition and is equal to or lower than said melting temperature in said gas dissolving step, at a tip portion of said continuous plasticator while maintaining said molten thermoplastic resin composition under a pressure equal to or higher than a critical pressure of carbon dioxide;
(iii) as a cell nuclei forming step, extruding said molten thermoplastic resin composition through a die connected to the tip portion of said continuous plasticator and set to an optimal expansion temperature of said molten thermoplastic resin composition, whereby said pressure of said molten thermoplastic resin composition is lowered to a pressure equal to or lower than said critical pressure of carbon dioxide to induce formation of cell nuclei; and
(iv) as an expansion control step, rapidly cooling the thus-extruded expanded thermoplastic resin product to a temperature equal to or lower than a crystallization temperature or glass transition temperature of said thermoplastic resin, wherein
said addition of said carbon dioxide in said gas dissolving step (i) is performed by the addition method of carbon dioxide as defined in claim 1.

8. A process for the production of an expanded thermoplastic resin product, said process comprising:
(i) as a gas dissolving step, melting a thermoplastic resin at a temperature equal to or higher than a melting point or plasticizing temperature of said thermoplastic resin in a resin-plasticating cylinder (23) equipped with a feed line through which a blowing agent is added to the molten thermoplastic resin, adding carbon dioxide in a proportion of from 0.1 to 30 parts by weight per 100 parts by weight of said thermoplastic resin, and forming a molten thermoplastic resin composition in which said thermoplastic resin and said carbon dioxide are in a mutually-dissolved state;

(ii) as a cooling step, cooling said molten thermoplastic resin composition to a temperature, which is equal to or higher than a plasticizing temperature of said molten thermoplastic resin composition, is higher by 50° C. or less than said plasticizing temperature of said molten thermoplastic resin composition and is equal to or lower than said melting temperature in said gas dissolving step, in said resin-plasticating cylinder (23);

(iii) as a metering and injection step, metering the thus-cooled molten thermoplastic resin composition and injecting the same into a mold (30); and (iv) as an expansion control step, inducing formation of cell nuclei to control an expansion ratio by lowering a pressure in said mold (30), wherein (v) said addition of said carbon dioxide in said gas dissolving step is performed by the addition method of carbon dioxide as defined in claim 1.

9. The process of claim 8, wherein said expansion control step is performed by releasing a high-pressure gas filled in said mold (30) and/or causing at least a portion of a core of said mold (30) to move backward subsequent to said injection of said molten thermoplastic resin composition.

10. The method of claim 1, wherein said liquefied carbon dioxide to be charged from said liquefied carbon dioxide cylinder (1) into said predetermined amount deliverable pump (2) is controlled such that said liquified carbon dioxide has a constant temperature in a range of from −30 to 15° C. at an inlet of said predetermined amount deliverable pump (2).

11. The method of claim 1, wherein a flow line from said liquefied carbon dioxide cylinder (1) to said predetermined amount deliverable pump (2) is cooled by a cooling medium circulator in which a cooling medium is controlled at a constant temperature in a range of from −60 to 0° C.

12. The method of claim 2, wherein a flow line from said liquefied carbon dioxide cylinder (1) to said predetermined amount deliverable pump (2) is cooled by a cooling medium circulator in which a cooling medium is controlled at a constant temperature in a range of from −60 to 0° C.

13. The method of claim 1, wherein said predetermined amount deliverable pump (2) is controlled to have a constant volumetric efficiency in a range of from 60 to 95%.

14. The method of claim 2, wherein said predetermined amount deliverable pump (2) is controlled to have a constant volumetric efficiency in a range of from 60 to 95%.

15. The method of claim 3, wherein said predetermined amount deliverable pump (2) is controlled to have a constant volumetric efficiency in a range of from 60 to 95%.

16. The method of claim 1, wherein said liquefied carbon dioxide cylinder (1) is a siphon cylinder.

17. The method of claim 2, wherein said liquefied carbon dioxide cylinder (1) is a siphon cylinder.

18. The method of claim 3, wherein said liquefied carbon dioxide cylinder (1) is a siphon cylinder.

19. The method of claim 4, wherein said liquefied carbon dioxide cylinder (1) is a siphon cylinder.

* * * * *